(12) United States Patent
Mann et al.

(10) Patent No.: US 7,623,620 B2
(45) Date of Patent: Nov. 24, 2009

(54) REFLECTIVE X-RAY MICROSCOPE AND INSPECTION SYSTEM FOR EXAMINING OBJECTS WITH WAVELENGTHS <100 NM

(75) Inventors: Hans-Jürgen Mann, Oberkochen (DE); Udo Dinger, Oberkochen (DE); Wilhelm Ulrich, Aalen (DE); Wolfgang Reinecke, Zeuthen (DE); Thomas Engel, Erfurt (DE); Axel Zibold, Jena (DE); Wolfgang Harnisch, Lehesten (DE); Marco Wedowski, Oberkochen (DE); Dieter Pauschinger, Berlin (DE)

(73) Assignee: Carl Zeiss SMT AG, Oberkochen (DE)

( * ) Notice: Subject to any disclaimer, the term of this patent is extended or adjusted under 35 U.S.C. 154(b) by 590 days.

(21) Appl. No.: 10/983,362

(22) Filed: Nov. 8, 2004

(65) Prior Publication Data

US 2005/0201514 A1    Sep. 15, 2005

Related U.S. Application Data

(63) Continuation of application No. PCT/EP03/04803, filed on May 8, 2003.

(30) Foreign Application Priority Data

May 10, 2002    (DE) ................................. 102 20 815
May 10, 2002    (DE) ................................. 102 20 816

(51) Int. Cl.
  *G11K 7/00*    (2006.01)
(52) U.S. Cl. ........................................ 378/43; 359/368
(58) Field of Classification Search .................. 378/43, 378/87, 62, 196–197, 34; 359/365–366, 359/369, 368–378

See application file for complete search history.

(56) References Cited

U.S. PATENT DOCUMENTS

| | | | |
|---|---|---|---|
| 4,798,450 A | 1/1989 | Suzuki | 350/505 |
| 5,022,064 A | 6/1991 | Iketaki | 378/145 |
| 5,063,586 A | 11/1991 | Jewell et al. | 378/34 |
| 5,131,023 A | 7/1992 | Yasugaki et al. | 378/43 |
| 5,144,497 A | 9/1992 | Kato et al. | 359/859 |
| 5,153,898 A | 10/1992 | Suzuki et al. | 378/34 |
| 5,177,774 A * | 1/1993 | Suckewer et al. | 378/43 |
| 5,222,113 A | 6/1993 | Thieme et al. | 378/43 |
| 5,291,339 A | 3/1994 | Mochimaru et al. | 359/859 |
| 5,311,565 A * | 5/1994 | Horikawa | 378/43 |
| 6,244,717 B1 | 6/2001 | Dinger | 359/859 |

(Continued)

FOREIGN PATENT DOCUMENTS

DE    3851297 T2    1/1995

(Continued)

*Primary Examiner*—Hoon Song
(74) *Attorney, Agent, or Firm*—Ohlandt, Greeley, Ruggiero & Perle, L.L.P.

(57) ABSTRACT

There is provided a reflective X-ray microscope for examining an object in an object plane. The reflective X-ray microscope includes (a) a first subsystem, having a first mirror and a second mirror, disposed in a beam path from the object plane to the image plane, and (b) a second subsystem, having a third mirror, situated downstream of the first subsystem in the beam path. The object is illuminated with radiation having a wavelength <100 nm, and the reflective X-ray microscope projects the object with magnification into an image plane.

25 Claims, 37 Drawing Sheets

U.S. PATENT DOCUMENTS

| | | | |
|---|---|---|---|
| 6,522,717 B1 * | 2/2003 | Murakami et al. | 378/43 |
| 6,710,341 B2 * | 3/2004 | Terauchi | 250/310 |
| 6,859,516 B2 * | 2/2005 | Schneider et al. | 378/43 |
| 2004/0212891 A1 * | 10/2004 | Dobschal et al. | 359/566 |

FOREIGN PATENT DOCUMENTS

| | | |
|---|---|---|
| DE | 69121972 T2 | 2/1997 |
| EP | 0459833 A2 | 5/1991 |
| EP | 0628806 A2 | 4/1994 |
| EP | 0314502 B1 | 8/1994 |
| EP | 0459833 B1 | 9/1996 |
| EP | 0962830 A1 | 12/1999 |
| JP | 02/223900 | 9/1990 |
| JP | 04321047 A | 11/1992 |
| JP | 06/349715 | 12/1994 |
| JP | 2001116900 A | 4/2001 |
| WO | WO 02/27401 A2 | 4/2002 |
| WO | WO 02/27402 A2 | 4/2002 |

* cited by examiner

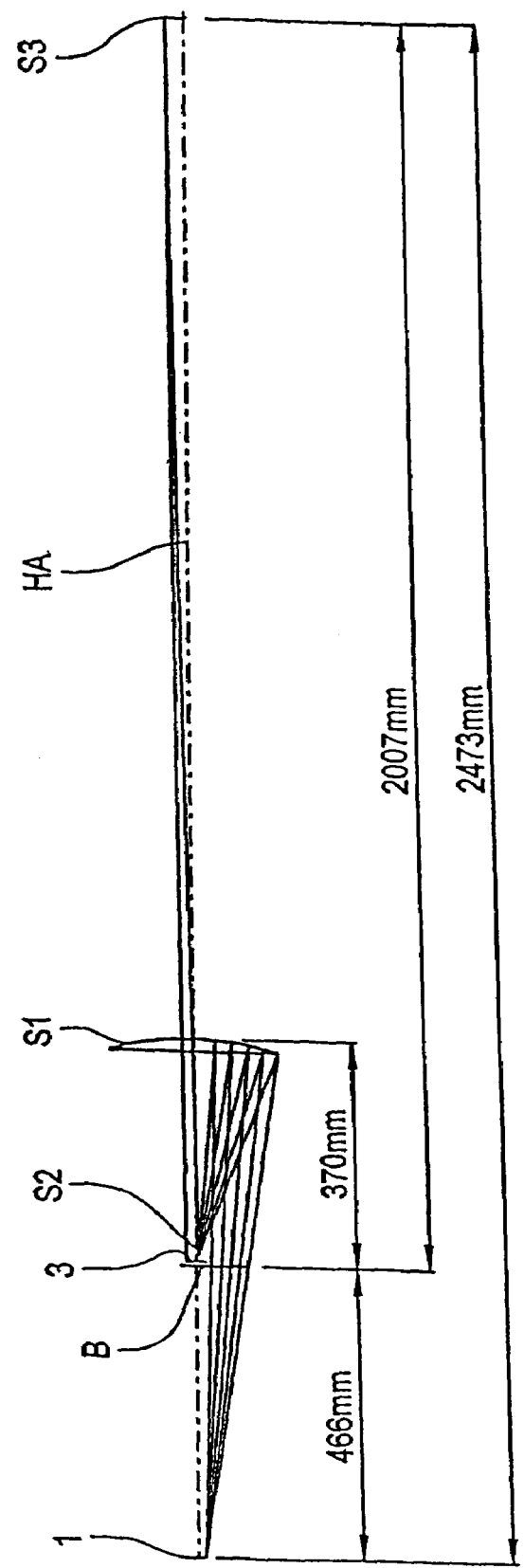

FIG. 1A

TABLE 1A

LENS NOTES:

Notes...
    ß'= -500
    konkav-konvex-konkav

GENERAL LENS DATA:

| | |
|---|---|
| Surfaces | : 7 |
| Stop | : 3 |
| System Aperture | : Object Space NA = 0.1672 |
| Glass Catalogs | : schott |
| Ray Aiming | : Real Reference, Cache On |
| X Pupil shift | : 0 |
| Y Pupil shift | : 0 |
| Z Pupil shift | : 0 |
| Apodization | :Uniform, factor = 0.00000E+000 |
| Effective Focal Length | : 234.2387 (in air) |
| Effective Focal Length | : 234.2387 (in image space) |
| Back Focal Length | : -112265.6 |
| Total Track | : 2333 |
| Image Space F/# | : 1.482005 |
| Paraxial Working F/# | : 1474.167 |
| Working F/# | : 1497.046 |
| Image Space NA | : 0.0003391746 |
| Object Space NA | : 0.1672 |
| Stop Radius | : 79.02767 |
| Paraxial Image Height | : 19.03943 |
| Paraxial Magnification | : -500 |
| Entrance Pupil Diameter | : 158.0553 |
| Entrance Pupil Position | : 325.5 |
| Exit Pupil Diameter | : 79.52777 |
| Exit Pupil Position | : 117421.5 |
| Field Type | : Object height in Millimeters |
| Maximum Field | : 0.03807887 |
| Primary Wave | : 0.0135 |
| Lens Units | : Millimeters |
| Angular Magnification | : -1.987423 |

Fields    : 8
Field Type: Object height in Millimeters

| # | X-Value | Y-Value | Weight |
|---|---|---|---|
| 1 | 0.000000 | -0.005000 | 1.000000 |
| 2 | 0.000000 | -0.012500 | 1.000000 |
| 3 | 0.000000 | -0.020000 | 1.000000 |
| 4 | 0.000000 | -0.027500 | 1.000000 |
| 5 | 0.000000 | -0.035000 | 1.000000 |
| 6 | 0.015000 | -0.005000 | 1.000000 |
| 7 | 0.015000 | -0.020000 | 1.000000 |
| 8 | 0.015000 | -0.035000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths  : 1
Units: Microns

| # | Value | Weight |
|---|---|---|
| 1 | 0.013500 | 1.000000 |

FIG. 1B

TABLE 1B

LENS NOTES:

Notes...
B' = -500
konkav-konvex-konkav

SURFACE DATA SUMMARY:

| Surf | Type | Comment | Radius | Thickness | Glass | Diameter | Conic |
|---|---|---|---|---|---|---|---|
| OBJ | STANDARD | OBJEKTEBENE-OE | Infinity | 140.5 | | 0.07615773 | 0 |
| 1 | STANDARD | HILFSFLÄCHE | Infinity | 325.5 | | 47.70722 | 0 |
| 2 | STANDARD | HILFSFLÄCHE | Infinity | 0 | | 158.0553 | 0 |
| >TO | STANDARD | BLENDE | Infinity | 370 | | 158.0553 | 0 |
| 4 | EVENASPH | 1.SPIEGEL | -500 | -352.5 | MIRROR | 276.962 | 0 |
| 5 | EVENASPH | 2.SPIEGEL | -3.5 | 1990 | MIRROR | 1.385541 | 0 |
| 6 | EVENASPH | 3.SPIEGEL | -4000 | -2000 | MIRROR | 38.53955 | 0 |
| A | STANDARD | BILDEBENE-BE | Infinity | | | 38.80791 | |

FIG. 1C

TABLE 1C

LENS NOTES:

```
Notes...
   A' = -500
   konkav-konvex-konkav
```

SURFACE DATA DETAIL:

```
Surface OBJ      : STANDARD
 Comment         : OBJEKTEBENE-OE
 Aperture        : Rectangular Aperture
 X Half Width    :      0.015
 Y Half Width    :      0.015
 X- Decenter     :          0
 Y- Decenter     :      -0.02
Surface    1     : STANDARD
 Comment         : HILFSFLÄCHE
 Aperture        : Rectangular Aperture
 X Half Width    :         30
 Y Half Width    :         15
 X- Decenter     :          0
 Y- Decenter     :     -20.64
Surface    2     : STANDARD
 Comment         : HILFSFLÄCHE
 Aperture        : Circular Aperture
 Minimum Radius  :          0
 Maximum Radius  :         30
 X- Decenter     :          0
 Y- Decenter     :     -48.98
Surface STO      : STANDARD
 Comment         : BLENDE
Surface    4     : EVENASPH
 Comment         : 1.SPIEGEL
 Coeff on r  2   :  -4.8307125e-006
 Coeff on r  4   :   1.507674e-010
 Coeff on r  6   :   5.954906e-016
 Coeff on r  8   :   9.963594e-022
 Coeff on r 10   :  -6.0635175e-027
 Coeff on r 12   :   9.0583726e-031
 Coeff on r 14   :          0
 Coeff on r 16   :          0
Surface    5     : EVENASPH
 Comment         : 2.SPIEGEL
 Coeff on r  2   :  -0.0029715707
 Coeff on r  4   :   0.00095749309
 Coeff on r  6   :   0.0054995085
 Coeff on r  8   :  -0.01948431
 Coeff on r 10   :   0.047391254
 Coeff on r 12   :  -0.081392844
 Coeff on r 14   :   0.083806863
 Coeff on r 16   :  -0.034839904
Surface    6     : EVENASPH
 Comment         : 3.SPIEGEL
 Coeff on r  2   :   1.6464231e-006
 Coeff on r  4   :   5.7633466e-009
 Coeff on r  6   :  -1.317449e-011
 Coeff on r  8   :   4.0280325e-014
 Coeff on r 10   :  -7.0734665e-017
 Coeff on r 12   :   5.3017923e-020
 Coeff on r 14   :          0
 Coeff on r 16   :          0
Surface IMA      : STANDARD
 Comment         : BILDEBENE-BE
```

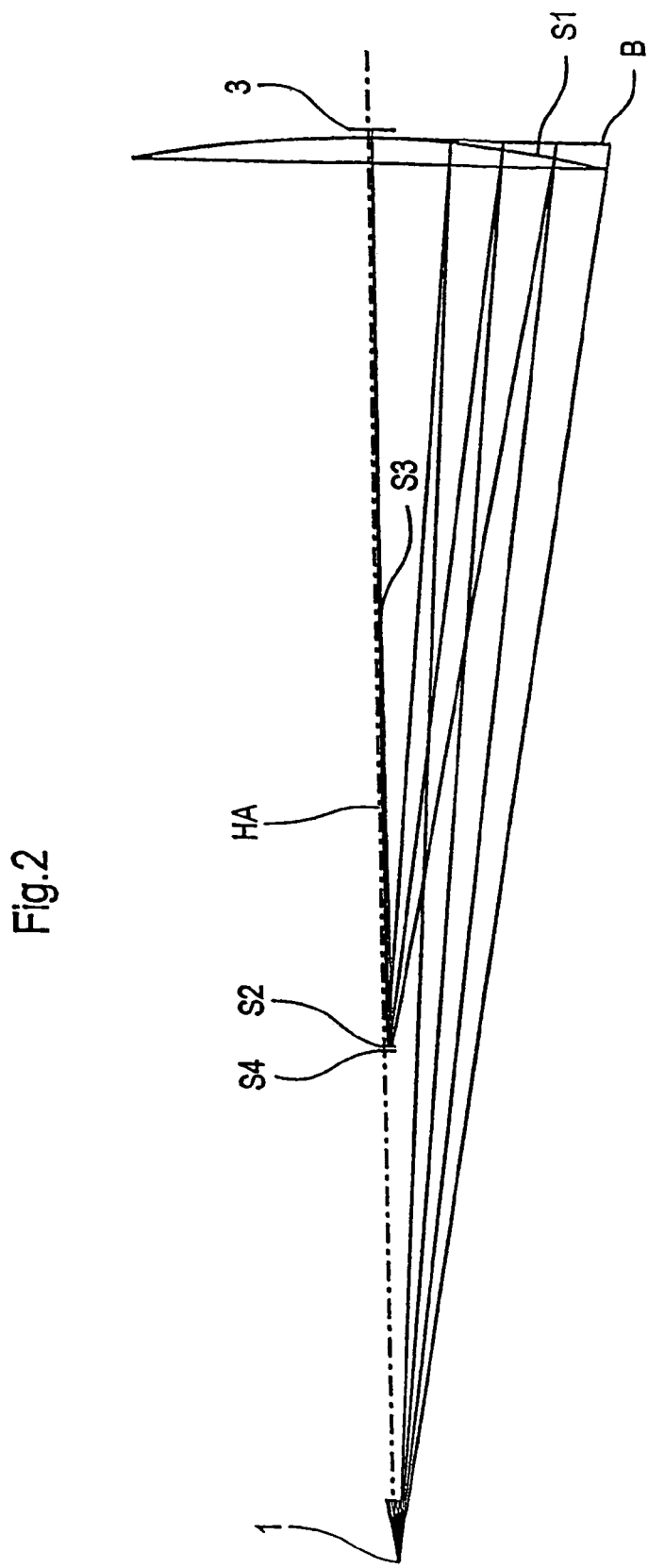

FIG. 2A

TABLE 2A

LENS NOTES:

Notes...
    β'=354
    konkav-konvex-konkav-konkav

GENERAL LENS DATA:

| | |
|---|---|
| Surfaces | : 7 |
| Stop | : 3 |
| System Aperture | : Object Space NA = 0.1672 |
| Glass Catalogs | : schott |
| Ray Aiming | : Real Reference, Cache On |
| X Pupil shift | : 0 |
| Y Pupil shift | : 0 |
| Z Pupil shift | : 0 |
| Apodization | :Uniform, factor = 0.00000E+000 |
| Effective Focal Length | : -15.36043 (in air) |
| Effective Focal Length | : -15.36043 (in image space) |
| Back Focal Length | : 3582.062 |
| Total Track | : 3013 |
| Image Space F/# | : 0.01442053 |
| Paraxial Working F/# | : 1043.713 |
| Working F/# | : 994.9058 |
| Image Space NA | : 0.0004790589 |
| Object Space NA | : 0.1672 |
| Stop Radius | : 532.5889 |
| Paraxial Image Height | : 13.47995 |
| Paraxial Magnification | : 354.0009 |
| Entrance Pupil Diameter | : 1065.178 |
| Entrance Pupil Position | : 3000 |
| Exit Pupil Diameter | : 5.20994 |
| Exit Pupil Position | : -5445.013 |
| Field Type | : Object height in Millimeters |
| Maximum Field | : 0.03807887 |
| Primary Wave | : 0.0135 |
| Lens Units | : Millimeters |
| Angular Magnification | : -204.4511 |

Fields       : 8
Field Type: Object height in Millimeters

| # | X-Value | Y-Value | Weight |
|---|---|---|---|
| 1 | 0.000000 | 0.005000 | 1.000000 |
| 2 | 0.000000 | 0.012500 | 1.000000 |
| 3 | 0.000000 | 0.020000 | 1.000000 |
| 4 | 0.000000 | 0.027500 | 1.000000 |
| 5 | 0.000000 | 0.035000 | 1.000000 |
| 6 | 0.015000 | 0.005000 | 1.000000 |
| 7 | 0.015000 | 0.020000 | 1.000000 |
| 8 | 0.015000 | 0.035000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths  : 1
Units: Microns

| # | Value | Weight |
|---|---|---|
| 1 | 0.013500 | 1.000000 |

FIG. 2B
TABLE 2B

LENS NOTES:

Notes...
A:=354
kvnkav-konvex-konkav-konkav

SURFACE DATA SUMMARY:

| Surf | Type | Comment | Radius | Thickness | Glass | Diameter | Conic |
|---|---|---|---|---|---|---|---|
| OBJ | STANDARD | | Infinity | Infinity | | 0.07615773 | 0 |
| 1 | STANDARD | HILFSFLACHE | Infinity | 140.5 | | 47.72672 | 0 |
| 2 | STANDARD | HILFSFLACHE | Infinity | 3000 | | 1065.179 | 0 |
| STO | EVENASPH | BLENDE | -2500 | 0 | MIRROR | 1046.393 | 0 |
| 4 | EVENASPH | | -166 | -1997 | MIRROR | 39.11943 | 0 |
| 5 | EVENASPH | | -50 | 1000 | MIRROR | -2.082316 | 0 |
| 6 | EVENASPH | | 2000 | -1010 | MIRROR | 40 | 0 |
| IMA | STANDARD | | Infinity | 2020 | | 100 | 0 |

FIG. 2C

TABLE 2C

LENS NOTES:

```
Notes...
ß'=354
konkav-konvex-konkav-konkav
```

SURFACE DATA DETAIL:

```
Surface OBJ    : STANDARD
 Aperture      : Rectangular Aperture
  X Half Width :        0.015
  Y Half Width :        0.015
  X- Decenter  :            0
  Y- Decenter  :         0.02
Surface    1   : STANDARD
 Comment       : HILFSFLÄCHE
 Aperture      : Rectangular Aperture
  X Half Width :           30
  Y Half Width :           15
  X- Decenter  :            0
  Y- Decenter  :       -20.64
Surface    2   : STANDARD
 Comment       : HILFSFLÄCHE
 Aperture      : Circular Aperture
  Minimum Radius :          0
  Maximum Radius :     198.75
  X- Decenter  :            0
  Y- Decenter  :      -331.25
Surface STO    : EVENASPH
 Comment       : BLENDE
  Coeff on r  2 : -1.7434327e-007
  Coeff on r  4 :  3.1374279e-013
  Coeff on r  6 :  5.3355533e-020
  Coeff on r  8 : -8.5318118e-028
  Coeff on r 10 :  2.8646746e-032
  Coeff on r 12 : -4.1365345e-039
  Coeff on r 14 :            0
  Coeff on r 16 :            0
Surface    4   : EVENASPH
  Coeff on r  2 :  3.3019781e-006
  Coeff on r  4 :  3.6808025e-008
  Coeff on r  6 :  1.7049583e-012
  Coeff on r  8 : -2.0350022e-015
  Coeff on r 10 :  5.2988305e-018
  Coeff on r 12 : -1.4240788e-021
  Coeff on r 14 :            0
  Coeff on r 16 :            0
Surface    5   : EVENASPH
  Coeff on r  2 :    0.0031086973
  Coeff on r  4 :   6.1575983e-005
  Coeff on r  6 :   -0.0012869219
  Coeff on r  8 :    0.0073299418
  Coeff on r 10 :    -0.020602843
  Coeff on r 12 :     0.024688225
  Coeff on r 14 :   -0.0012519234
  Coeff on r 16 :    -0.014071763
 Aperture      : Floating Aperture
  Maximum Radius :     1.041158
Surface    6   : EVENASPH
  Coeff on r  2 : -6.5912756e-005
  Coeff on r  4 : -1.5574759e-008
  Coeff on r  6 : -4.7738429e-010
  Coeff on r  8 :  7.5143917e-012
  Coeff on r 10 : -6.5517905e-014
  Coeff on r 12 :  2.2254561e-016
  Coeff on r 14 :            0
  Coeff on r 16 :            0
 Aperture      : Floating Aperture
  Maximum Radius :           20
Surface  IMA   : STANDARD
```

COATING DEFINITIONS:

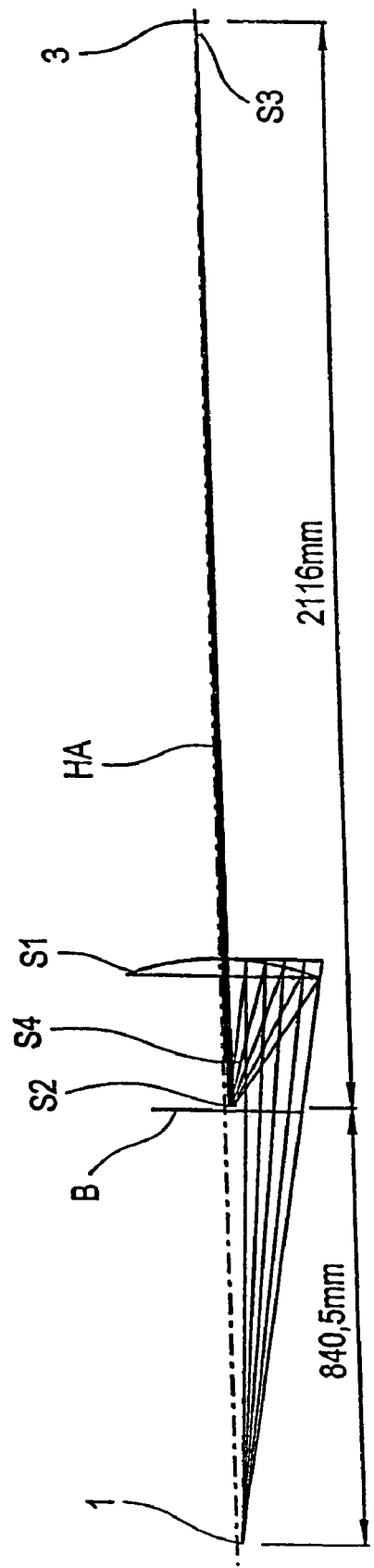

FIG. 3A

TABLE 3A

LENS NOTES:

Notes...
       β' = 530
      konkav - konvex - konkav - konkav

GENERAL LENS DATA:

| | | |
|---|---|---|
| Surfaces | : | 8 |
| Stop | : | 2 |
| System Aperture | : | Object Space NA = 0.1672 |
| Glass Catalogs | : | schott |
| Ray Aiming | : | Real Reference, Cache On |
| X Pupil shift | : | 0 |
| Y Pupil shift | : | 0 |
| Z Pupil shift | : | 0 |
| Apodization | : | Uniform, factor = 0.00000E+000 |
| Effective Focal Length | : | −80.6423 (in air) |
| Effective Focal Length | : | −80.6423 (in image space) |
| Back Focal Length | : | −35555.39 |
| Total Track | : | 2815.61 |
| Image Space F/# | : | 0.2828798 |
| Paraxial Working F/# | : | 1562.617 |
| Working F/# | : | 1576.998 |
| Image Space NA | : | 0.000319976 |
| Object Space NA | : | 0.1672 |
| Stop Radius | : | 142.5381 |
| Paraxial Image Height | : | 20.1818 |
| Paraxial Magnification | : | 530 |
| Entrance Pupil Diameter | : | 285.0762 |
| Entrance Pupil Position | : | 700 |
| Exit Pupil Diameter | : | 27.35677 |
| Exit Pupil Position | : | −42950.12 |
| Field Type | : | Object height in Millimeters |
| Maximum Field | : | 0.03807887 |
| Primary Wave | : | 0.0135 |
| Lens Units | : | Millimeters |
| Angular Magnification | : | −10.42068 |

Fields      : 8
Field Type: Object height in Millimeters

| # | X-Value | Y-Value | Weight |
|---|---|---|---|
| 1 | 0.000000 | 0.005000 | 1.000000 |
| 2 | 0.000000 | 0.012500 | 1.000000 |
| 3 | 0.000000 | 0.020000 | 1.000000 |
| 4 | 0.000000 | 0.027500 | 1.000000 |
| 5 | 0.000000 | 0.035000 | 1.000000 |
| 6 | 0.015000 | 0.005000 | 1.000000 |
| 7 | 0.015000 | 0.020000 | 1.000000 |
| 8 | 0.015000 | 0.035000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths    : 1
Units: Microns

| # | Value | Weight |
|---|---|---|
| 1 | 0.013500 | 1.000000 |

FIG. 3B

TABLE 3B

LENS NOTES:
```
Notes:...
   B'= 530
   konkav - konvex - konkav - konkav
```

SURFACE DATA SUMMARY:

| Srf | Type | Comment | Radius | Thickness | Glass | Diameter | Conic |
|---|---|---|---|---|---|---|---|
| OBJ | STANDARD | OBJEKT-EBENE | Infinity | 140.5 | | 0.07615773 | 0 |
| 1 | STANDARD | HILFSFLÄCHE | Infinity | 700 | | 47.71745 | 0 |
| STO | STANDARD | BLENDE | Infinity | 300 | | 285.0762 | 0 |
| 3 | STANDARD | HILFSFLÄCHE | Infinity | 0 | | 386.8558 | 0 |
| 4 | EVENASPH | 1.SPIEGEL | -500 | -285.69 | MIRROR | 374.3561 | 0 |
| 5 | EVENASPH | 2.SPIEGEL | -50 | 2081.3 | MIRROR | 30.41275 | 0 |
| 6 | STANDARD | 3.SPIEGEL-SPHÄR. | -166 | -2000 | MIRROR | 3.0007 | 0 |
| 7 | EVENASPH | 4.SPIEGEL | 4000 | 2020 | MIRROR | 39.28856 | 0 |
| IMA | STANDARD | BILD-EBENE | Infinity | | | 40.26898 | 0 |

FIG. 3C

TABLE 3C

LENS NOTES:

Notes...
    β´= 530.
    konkav - konvex - konkav - konkav

SURFACE DATA DETAIL:

```
Surface OBJ        : STANDARD
 Comment           : OBJEKT-EBENE
 Aperture          : Rectangular Aperture
 X Half Width      :         0.015
 Y Half Width      :         0.015
 X- Decenter       :             0
 Y- Decenter       :          0.03
Surface   1        : STANDARD
 Comment           : HILFSFLÄCHE
 Aperture          : Rectangular Aperture
 X Half Width      :            30
 Y Half Width      :            15
 X- Decenter       :             0
 Y- Decenter       :        -20.64
Surface STO        : STANDARD
 Comment           : BLENDE
Surface   3        : STANDARD
 Comment           : HILFSFLÄCHE
 Aperture          : Circular Aperture
 Minimum Radius    :             0
 Maximum Radius    :            73
 X- Decenter       :             0
 Y- Decenter       :       -119.87
Surface   4        : EVENASPH
 Comment           : 1.SPIEGEL
 Coeff on r  2     :  -2.4617005e-005
 Coeff on r  4     :   2.611535e-010
 Coeff on r  6     :   1.5508187e-015
 Coeff on r  8     :  -1.1008112e-020
 Coeff on r 10     :   4.8365227e-026
 Coeff on r 12     :   1.7895774e-030
 Coeff on r 14     :             0
 Coeff on r 16     :             0
Surface   5        : EVENASPH
 Comment           : 2.SPIEGEL
 Coeff on r  2     :   7.36621e-006
 Coeff on r  4     :   6.6871564e-007
 Coeff on r  6     :   2.6494143e-009
 Coeff on r  8     :  -1.063463e-011
 Coeff on r 10     :   1.4770529e-014
 Coeff on r 12     :   5.4578804e-018
 Coeff on r 14     :             0
 Coeff on r 16     :             0
Surface   6        : STANDARD
 Comment           : 3.SPIEGEL-SPHÄR.
Surface   7        : EVENASPH
 Comment           : 4.SPIEGEL
 Coeff on r  2     :  -4.6390308e-007
 Coeff on r  4     :   2.9425212e-009
 Coeff on r  6     :  -8.911427e-012
 Coeff on r  8     :   1.9486952e-014
 Coeff on r 10     :  -3.024605e-017
 Coeff on r 12     :   2.3357399e-020
 Coeff on r 14     :             0
 Coeff on r 16     :             0
Surface IMA        : STANDARD
 Comment           : BILD-EBENE
```

COATING DEFINITIONS:

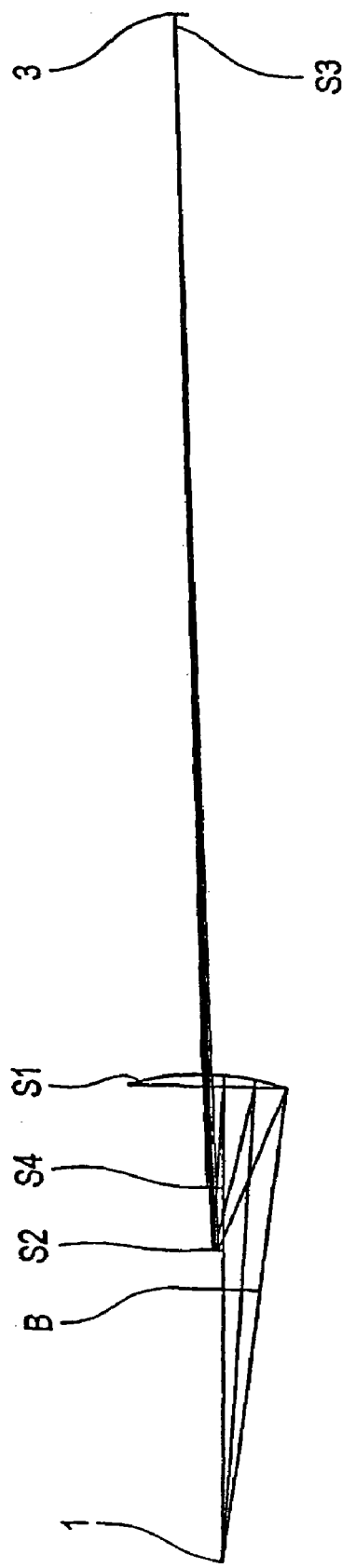

FIG. 4A

TABLE 4A

LENS NOTES:

Notes... ß'=500
    konkav-konvex-konkav,- Spiegel 3 und 4 sphärisch

GENERAL LENS DATA:

| | | |
|---|---|---|
| Surfaces | : | 8 |
| Stop | : | 3 |
| System Aperture | : | Object Space NA = 0.1672 |
| Glass Catalogs | : | schott |
| Ray Aiming | : | Real Reference, Cache On |
|   X Pupil shift | : | 0 |
|   Y Pupil shift | : | 0 |
|   Z Pupil shift | : | 0 |
| Apodization | : | Uniform, factor = 0.00000E+000 |
| Effective Focal Length | : | -70.30086 (in air) |
| Effective Focal Length | : | -70.30086 (in image space) |
| Back Focal Length | : | -28049.43 |
| Total Track | : | 2508.5 |
| Image Space F/# | : | 0.4447864 |
| Paraxial Working F/# | : | 1474.167 |
| Working F/# | : | 1495.231 |
| Image Space NA | : | 0.0003391745 |
| Object Space NA | : | 0.1672 |
| Stop Radius | : | 79.02767 |
| Paraxial Image Height | : | 19.03943 |
| Paraxial Magnification | : | 500 |
| Entrance Pupil Diameter | : | 158.0553 |
| Entrance Pupil Position | : | 325.5 |
| Exit Pupil Diameter | : | 23.85146 |
| Exit Pupil Position | : | -35178.54 |
| Field Type | : | Object height in Millimeters |
| Maximum Field | : | 0.03807887 |
| Primary Wave | : | 0.0135 |
| Lens Units | : | Millimeters |
| Angular Magnification | : | -6.626653 |

Fields    : 8
Field Type: Object height in Millimeters

| # | X-Value | Y-Value | Weight |
|---|---|---|---|
| 1 | 0.000000 | 0.005000 | 1.000000 |
| 2 | 0.000000 | 0.012500 | 1.000000 |
| 3 | 0.000000 | 0.020000 | 1.000000 |
| 4 | 0.000000 | 0.027500 | 1.000000 |
| 5 | 0.000000 | 0.035000 | 1.000000 |
| 6 | 0.015000 | 0.005000 | 1.000000 |
| 7 | 0.015000 | 0.020000 | 1.000000 |
| 8 | 0.015000 | 0.035000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths    : 1
Units: Microns

| # | Value | Weight |
|---|---|---|
| 1 | 0.013500 | 1.000000 |

FIG. 4B

TABLE 4B

LENS NOTES:

Notes... β'=500
konkav-konvex-konkav-konkav, Spiegel 3 und 4 sphärisch

SURFACE DATA SUMMARY:

| Surf | Type | Comment | Radius | Thickness | Glass | Diameter | Conic |
|------|------|---------|--------|-----------|-------|----------|-------|
| OBJ | STANDARD | OBJEKT-EBENE | Infinity | 140.5 | | 0.07615773 | 0 |
| 1 | STANDARD | HILFSFLÄCHE | Infinity | 325.5 | | 47.70722 | 0 |
| 2 | STANDARD | HILFSFLÄCHE | Infinity | 0 | | 158.0553 | 0 |
| STO | STANDARD | BLENDE | Infinity | 370 | | 158.0553 | 0 |
| 4 | EVENASPH | 1.SPIEGEL | -500 | -305 | MIRROR | 276.6939 | 0 |
| 5 | EVENASPH | 2.SPIEGEL | -100 | 2108 | MIRROR | 24.81398 | 0 |
| 6 | STANDARD | 3.SPIEGEL-SPHÄR. | -216 | -2000 | MIRROR | 3.494166 | 0 |
| 7 | STANDARD | 4.SPIEGEL-SPHÄR. | 4000 | 2010 | MIRROR | 37.08851 | 0 |
| IMA | STANDARD | BILD-EBENE | Infinity | | | 37.94685 | 0 |

FIG. 4C

TABLE 4C

LENS NOTES:

Notes... ß'=500
    konkav-konvex-konkav-konkav, Spiegel 3 und 4 sphärisch

SURFACE DATA DETAIL:

```
Surface OBJ      : STANDARD
  Comment        : OBJEKT-EBENE
  Aperture       : Rectangular Aperture
  X Half Width   :       0.015
  Y Half Width   :       0.015
  X- Decenter    :           0
  Y- Decenter    :       +0.02
Surface    1     : STANDARD
  Comment        : HILFSFLÄCHE
  Aperture       : Rectangular Aperture
  X Half Width   :          30
  Y Half Width   :          15
  X- Decenter    :           0
  Y- Decenter    :      -20.64
Surface    2     : STANDARD
  Comment        : HILFSFLÄCHE
  Aperture       : Circular Aperture
  Minimum Radius :           0
  Maximum Radius :          30
  X- Decenter    :           0
  Y- Decenter    :      -48.98
Surface STO      : STANDARD
  Comment        : BLENDE
Surface    4     : EVENASPH
  Comment        : 1.SPIEGEL
  Coeff on r  2  :  -4.6103352e-005
  Coeff on r  4  :   4.5797537e-011
  Coeff on r  6  :   1.086501e-015
  Coeff on r  8  :  -3.224814e-020
  Coeff on r 10  :   1.7635536e-026
  Coeff on r 12  :   1.8446481e-029
  Coeff on r 14  :           0
  Coeff on r 16  :           0
Surface    5     : EVENASPH
  Comment        : 2.SPIEGEL
  Coeff on r  2  :   -0.0033081204
  Coeff on r  4  :  -1.5505972e-007
  Coeff on r  6  :   1.713275e-009
  Coeff on r  8  :  -1.0034183e-011
  Coeff on r 10  :   1.1489741e-014
  Coeff on r 12  :   4.6187442e-017
  Coeff on r 14  :           0
  Coeff on r 16  :           0
Surface    6     : STANDARD
  Comment        : 3.SPIEGEL-SPHÄR.
Surface    7     : STANDARD
  Comment        : 4.SPIEGEL-SPHÄR.
Surface IMA      : STANDARD
  Comment        : BILD-EBENE
```

COATING DEFINITIONS:

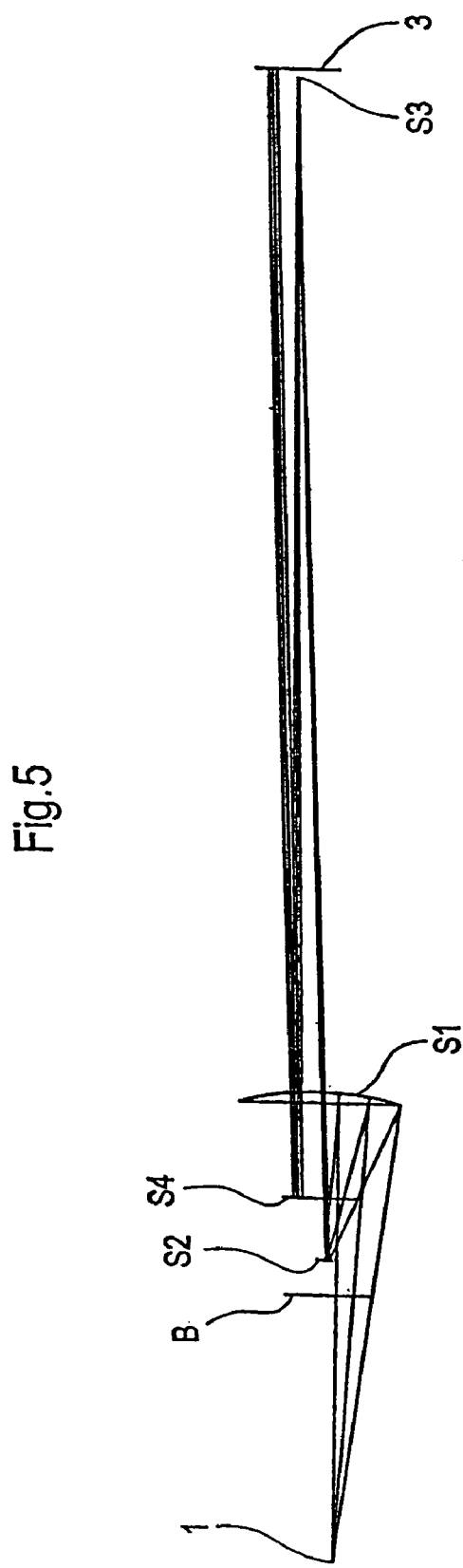

FIG. 5A

TABLE 5A

LENS NOTES:

Notes... A'=500
        konkav-konvex-konkav-konkav, Spiegel 3 und 4 sphärisch
        Objektfeld:2x=200pm, y=5pm-100pm mit Wellenfrontfehler <20mλ

SURFACE DATA DETAIL:

```
Surface OBJ        : STANDARD
  Comment          : OBJEKT-EBENE
  Aperture         : Rectangular Aperture
   X Half Width    :           0.1
   Y Half Width    :           0.015
   X- Decenter     :           0
   Y- Decenter     :           0.085
Surface    1       : STANDARD
  Comment          : HILFSFLÄCHE
  Aperture         : Rectangular Aperture
   X Half Width    :          30
   Y Half Width    :          15
   X- Decenter     :           0
   Y- Decenter     :         -20.64
Surface    2       : STANDARD
  Comment          : HILFSFLÄCHE
  Aperture         : Circular Aperture
   Minimum Radius  :           0
   Maximum Radius  :          30
   X- Decenter     :           0
   Y- Decenter     :         -48.98
Surface STO        : STANDARD
  Comment          : BLENDE
Surface    4       : EVENASPH
  Comment          : 1.SPIEGEL
   Coeff on r  2   :  -4.6094988e-005
   Coeff on r  4   :   5.1127578e-011
   Coeff on r  6   :   4.8723006e-016
   Coeff on r  8   :  -1.0557709e-020
   Coeff on r 10   :   5.2110287e-026
   Coeff on r 12   :   7.3206667e-030
   Coeff on r 14   :           0
   Coeff on r 16   :           0
Surface    5       : EVENASPH
  Comment          : 2.SPIEGEL
   Coeff on r  2   :  -0.0033070554
   Coeff on r  4   :  -6.8871027e-008
   Coeff on r  6   :   4.3841886e-010
   Coeff on r  8   :  -3.4827214e-012
   Coeff on r 10   :   6.0031516e-015
   Coeff on r 12   :   1.6086521e-017
   Coeff on r 14   :           0
   Coeff on r 16   :           0
Surface    6       : STANDARD
  Comment          : 3.SPIEGEL-SPHÄR.
Surface    7       : STANDARD
  Comment          : 4.SPIEGEL-SPHÄR.
Surface IMA        : STANDARD
  Comment          : BILD-EBENE
```

COATING DEFINITIONS:

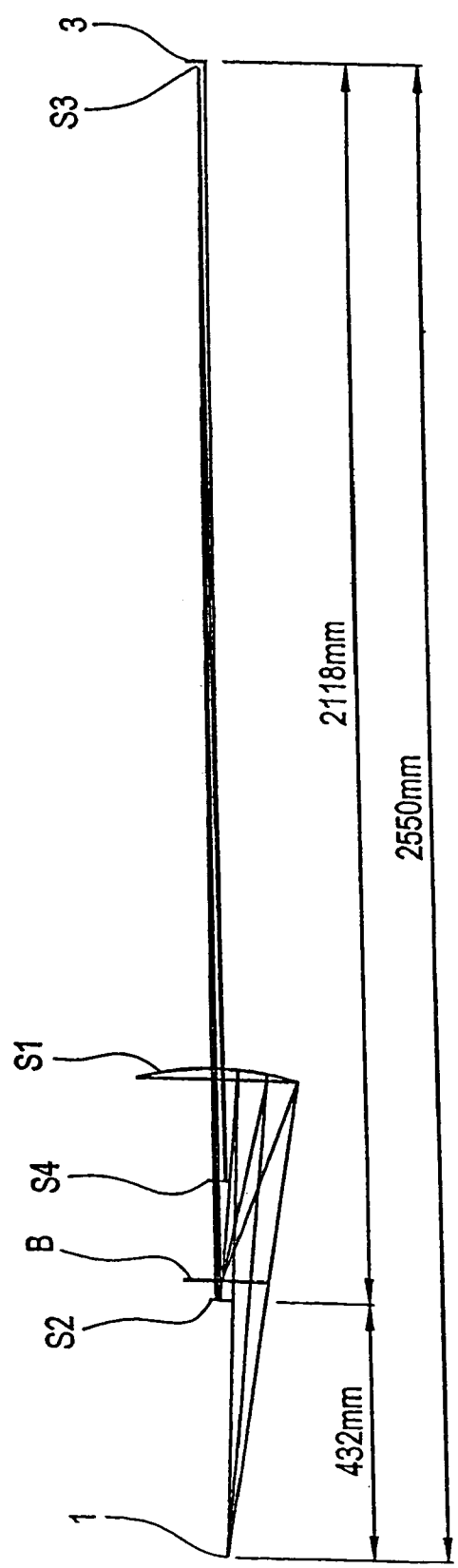

FIG. 6A

TABLE 6A

LENS NOTES:

Notes... β' = -500
Alle Spiegel konkav, Spiegel 3 und 4 sphärisch

GENERAL LENS DATA:

| | | |
|---|---|---|
| Surfaces | : | 8 |
| Stop | : | 3 |
| System Aperture | : | Object Space NA = 0.1672 |
| Glass Catalogs | : | schott |
| Ray Aiming | : | Real Reference, Cache On |
| X Pupil shift | : | 0 |
| Y Pupil shift | : | 0 |
| Z Pupil shift | : | 0 |
| Apodization | : | Uniform, factor = 0.00000E+000 |
| Effective Focal Length | : | 37.39941 (in air) |
| Effective Focal Length | : | 37.39941 (in image space) |
| Back Focal Length | : | -11587.69 |
| Total Track | : | 2409.22 |
| Image Space F/# | : | 0.2366223 |
| Paraxial Working F/# | : | 1474.167 |
| Working F/# | : | 1492.687 |
| Image Space NA | : | 0.0003391745 |
| Object Space NA | : | 0.1672 |
| Stop Radius | : | 79.02767 |
| Paraxial Image Height | : | 19.03943 |
| Paraxial Magnification | : | -500 |
| Entrance Pupil Diameter | : | 158.0553 |
| Entrance Pupil Position | : | 325.5 |
| Exit Pupil Diameter | : | 12.68697 |
| Exit Pupil Position | : | -18608.47 |
| Field Type | : | Object height in Millimeters |
| Maximum Field | : | 0.03807887 |
| Primary wave | : | 0.0135 |
| Lens Units | : | Millimeters |
| Angular Magnification | : | 12.45809 |

Fields : 8
Field Type: Object height in Millimeters

| # | X-Value | Y-Value | Weight |
|---|---|---|---|
| 1 | 0.000000 | 0.005000 | 1.000000 |
| 2 | 0.000000 | 0.012500 | 1.000000 |
| 3 | 0.000000 | 0.020000 | 1.000000 |
| 4 | 0.000000 | 0.027500 | 1.000000 |
| 5 | 0.000000 | 0.035000 | 1.000000 |
| 6 | 0.015000 | 0.005000 | 1.000000 |
| 7 | 0.015000 | 0.020000 | 1.000000 |
| 8 | 0.015000 | 0.035000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

Wavelengths : 1
Units: Microns

| # | Value | Weight |
|---|---|---|
| 1 | 0.013500 | 1.000000 |

FIG. 6B

TABLE 6B

LENS NOTES:

Notes... β' = -500
Alle Spiegel konkav, Spiegel 3 und 4 sphärisch

SURFACE DATA SUMMARY:

| Surf | Type | Comment | Radius | Thickness | Glass | Diameter | Conic |
|---|---|---|---|---|---|---|---|
| OBJ | STANDARD | OBJEKT-EBENE | Infinity | 140.5 | | 0.07615773 | 0 |
| 1 | STANDARD | HILFSFLÄCHE | Infinity | 325.5 | | 47.70722 | 0 |
| 2 | STANDARD | HILFSFLÄCHE | Infinity | 0 | | 158.0553 | 0 |
| STO | STANDARD | BLENDE | Infinity | 370 | | 158.0553 | 0 |
| 4 | EVENASPH | 1.SPIEGEL | -500 | -404.28 | MIRROR | 277.1741 | 0 |
| 5 | EVENASPH | 2.SPIEGEL | 100 | 2108 | MIRROR | 24.79504 | 0 |
| 6 | STANDARD | 3.SPIEGEL-SPHÄR. | -216 | -1900 | MIRROR | 3.507399 | 0 |
| 7 | STANDARD | 4.SPIEGEL-SPHÄR. | 4000 | 1910 | MIRROR | 35.32319 | 0 |
| IMA | STANDARD | BILD-EBENE | Infinity | | | 37.93232 | 0 |

FIG. 6C

TABLE 6C

LENS NOTES:

Notes... ß'= -500
    Alle Spiegel konkav, Spiegel 3 und 4 sphärisch

SURFACE DATA DETAIL:

```
Surface OBJ       : STANDARD
  Comment         : OBJEKT-EBENE
  Aperture        : Rectangular Aperture
  X Half Width    :      0.015
  Y Half Width    :      0.015
  X- Decenter     :          0
  Y- Decenter     :       0.02
Surface    1      : STANDARD
  Comment         : HILFSFLÄCHE
  Aperture        : Rectangular Aperture
  X Half Width    :         30
  Y Half Width    :         15
  X- Decenter     :          0
  Y- Decenter     :     -20.64
Surface    2      : STANDARD
  Comment         : HILFSFLÄCHE
  Aperture        : Circular Aperture
  Minimum Radius  :          0
  Maximum Radius  :         30
  X- Decenter     :          0
  Y- Decenter     :     -48.98
Surface STO       : STANDARD
  Comment         : BLENDE
Surface    4      : EVENASPH
  Comment         : 1.SPIEGEL
  Coeff on r  2   :   2.7769148e-005
  Coeff on r  4   :   2.2488572e-010
  Coeff on r  6   :   1.1599273e-015
  Coeff on r  8   :  -2.9110643e-020
  Coeff on r 10   :   1.1856427e-024
  Coeff on r 12   :  -1.6412839e-029
  Coeff on r 14   :          0
  Coeff on r 16   :          0
Surface    5      : EVENASPH
  Comment         : 2.SPIEGEL
  Coeff on r  2   :     0.0027208747
  Coeff on r  4   :   3.1374819e-008
  Coeff on r  6   :   7.8315561e-010
  Coeff on r  8   :  -8.0650957e-012
  Coeff on r 10   :   3.8132831e-014
  Coeff on r 12   :  -6.7855098e-017
  Coeff on r 14   :          0
  Coeff on r 16   :          0
Surface    6      : STANDARD
  Comment         : 3.SPIEGEL-SPHÄR.
Surface    7      : STANDARD
  Comment         : 4.SPIEGEL-SPHÄR.
Surface IMA       : STANDARD
  Comment         : BILD-EBENE
```

COATING DEFINITIONS:

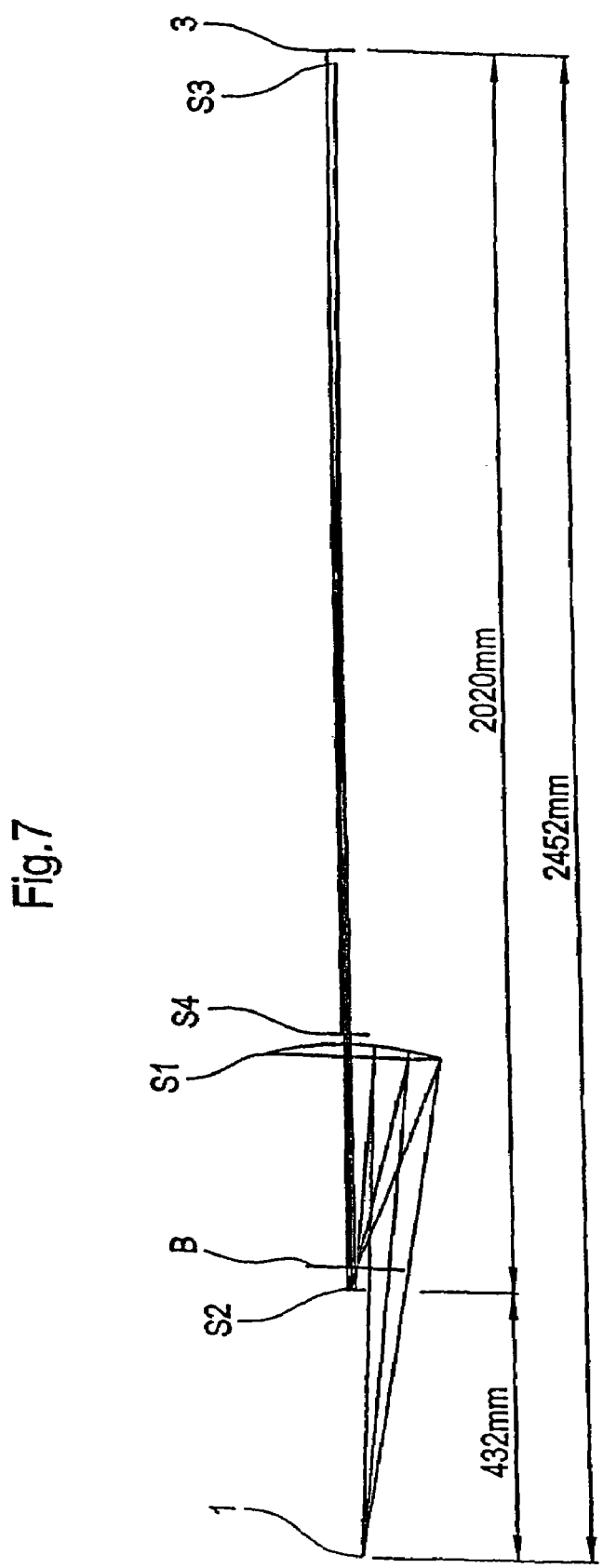

FIG. 7A

TABLE 7A

LENS NOTES:

Notes... B'= 500
      konkav-konkav-konvex-konkav

GENERAL LENS DATA:

```
Surfaces                   :                 8
Stop                       :                .3
System Aperture            : Object Space NA = 0.1672
Glass Catalogs             : schott
Ray Aiming                 : Real Reference, Cache On
  X Pupil shift            :                 0
  Y Pupil shift            :                 0
  Z Pupil shift            :                 0
Apodization                :Uniform, factor =   0.00000E+000
Effective Focal Length     :       -196.9264 (in air)
Effective Focal Length     :       -196.9264 (in image space)
Back Focal Length          :        -91931.51
Total Track                :          2311.22
Image Space F/#            :         1.245933
Paraxial Working F/#       :         1474.167
Working F/#                :         1489.404
Image Space NA             :      0.0003391746
Object Space NA            :           0.1672
Stop Radius                :         79.02767
Paraxial Image Height      :         30.92329
Paraxial Magnification     :              500
Entrance Pupil Diameter    :         158.0553
Entrance Pupil Position    :            325.5
Exit Pupil Diameter        :         66.84893
Exit Pupil Position        :        -98294.58
Field Type                 : Object height in Millimeters
Maximum Field              :       0.06184658
Primary Wave               :           0.0135
Lens Units                 : Millimeters
Angular Magnification      :        -2.364366

Fields         : 8
Field Type: Object height in Millimeters
 #       X-Value       Y-Value       Weight
 1       0.000000      0.030000      1.000000
 2       0.000000      0.037500      1.000000
 3       0.000000      0.045000      1.000000
 4       0.000000      0.052500      1.000000
 5       0.000000      0.060000      1.000000
 6       0.015000      0.030000      1.000000
 7       0.015000      0.045000      1.000000
 8       0.015000      0.060000      1.000000

Vignetting Factors
 #     VDX       VDY       VCX       VCY       VAN
 1  0.000000  0.000000  0.000000  0.000000  0.000000
 2  0.000000  0.000000  0.000000  0.000000  0.000000
 3  0.000000  0.000000  0.000000  0.000000  0.000000
 4  0.000000  0.000000  0.000000  0.000000  0.000000
 5  0.000000  0.000000  0.000000  0.000000  0.000000
 6  0.000000  0.000000  0.000000  0.000000  0.000000
 7  0.000000  0.000000  0.000000  0.000000  0.000000
 8  0.000000  0.000000  0.000000  0.000000  0.000000

Wavelengths    : 1
Units: Microns
 #         Value         Weight
 1       0.013500       1.000000
```

FIG. 7B

TABLE 7B

LENS NOTES:

Notes... A' = 500
konkav-konkav-konvex-konkav

SURFACE DATA SUMMARY:

| | Type | Comment | Radius | Thickness | Glass | Diameter | Conic |
|---|---|---|---|---|---|---|---|
| OBJ | STANDARD | OBJEKT-EBENE | Infinity | 140.5 | | 0.1236932 | 0 |
| 1 | STANDARD | HILFSFLÄCHE | Infinity | 325.5 | | 47.74043 | 0 |
| 2 | STANDARD | HILFSFLÄCHE | Infinity | 0 | | 158.0553 | 0 |
| 3 | STANDARD | BLENDE | Infinity | 370 | | 158.0553 | 0 |
| 4 | EVENASPH | 1.SPIEGEL | -500 | -404.28 | MIRROR | 277.2035 | 0 |
| 5 | EVENASPH | 2.SPIEGEL | 100 | 2000 | MIRROR | 25.1518 | 0 |
| 6 | STANDARD | 3.SPIEGEL-SPHÄR. | 190 | -1580 | MIRROR | 4.422261 | 0 |
| 7 | STANDARD | 4.SPIEGEL-SPHÄR. | 3400 | 1600 | MIRROR | 61.67181 | 0 |
| IMA | STANDARD | BILD-EBENE | Infinity | | | 61.75582 | |

FIG. 7C

TABLE 7C

LENS NOTES:

Notes... s' = 500
   konkav-konkav-konvex-konkav

SURFACE DATA DETAIL:

| | |
|---|---|
| Surface OBJ | : STANDARD |
| Comment | : OBJEKT-EBENE |
| Aperture | : Rectangular Aperture |
| X Half Width | : 0.015 |
| Y Half Width | : 0.015 |
| X- Decenter | : 0 |
| Y- Decenter | : 0.045 |
| Surface 1 | : STANDARD |
| Comment | : HILFSFLÄCHE |
| Aperture | : Rectangular Aperture |
| X Half Width | : 30 |
| Y Half Width | : 15 |
| X- Decenter | : 0 |
| Y- Decenter | : -20.64 |
| Surface 2 | : STANDARD |
| Comment | : HILFSFLÄCHE |
| Aperture | : Circular Aperture |
| Minimum Radius | : 0 |
| Maximum Radius | : 30 |
| X- Decenter | : 0 |
| Y- Decenter | : -48.98 |
| Surface STO | : STANDARD |
| Comment | : BLENDE |
| Surface 4 | : EVENASPH |
| Comment | : 1.SPIEGEL |
| Coeff on r 2 | : 2.70268e-005 |
| Coeff on r 4 | : 2.2512635e-010 |
| Coeff on r 6 | : 8.2044497e-016 |
| Coeff on r 8 | : -7.579954e-022 |
| Coeff on r 10 | : 1.102694e-025 |
| Coeff on r 12 | : -1.2494723e-030 |
| Coeff on r 14 | : 0 |
| Coeff on r 16 | : 0 |
| Surface 5 | : EVENASPH |
| Comment | : 2.SPIEGEL |
| Coeff on r 2 | : 0.0026219304 |
| Coeff on r 4 | : 4.9915565e-008 |
| Coeff on r 6 | : 5.9995692e-011 |
| Coeff on r 8 | : -3.0213474e-013 |
| Coeff on r 10 | : 4.3389295e-016 |
| Coeff on r 12 | : 6.1610188e-019 |
| Coeff on r 14 | : 0 |
| Coeff on r 16 | : 0 |
| Surface 6 | : STANDARD |
| Comment | : 3.SPIEGEL-SPHÄR. |
| Surface 7 | : STANDARD |
| Comment | : 4.SPIEGEL-SPHÄR. |
| Surface IMA | : STANDARD |
| Comment | : BILD-EBENE |

COATING DEFINITIONS:

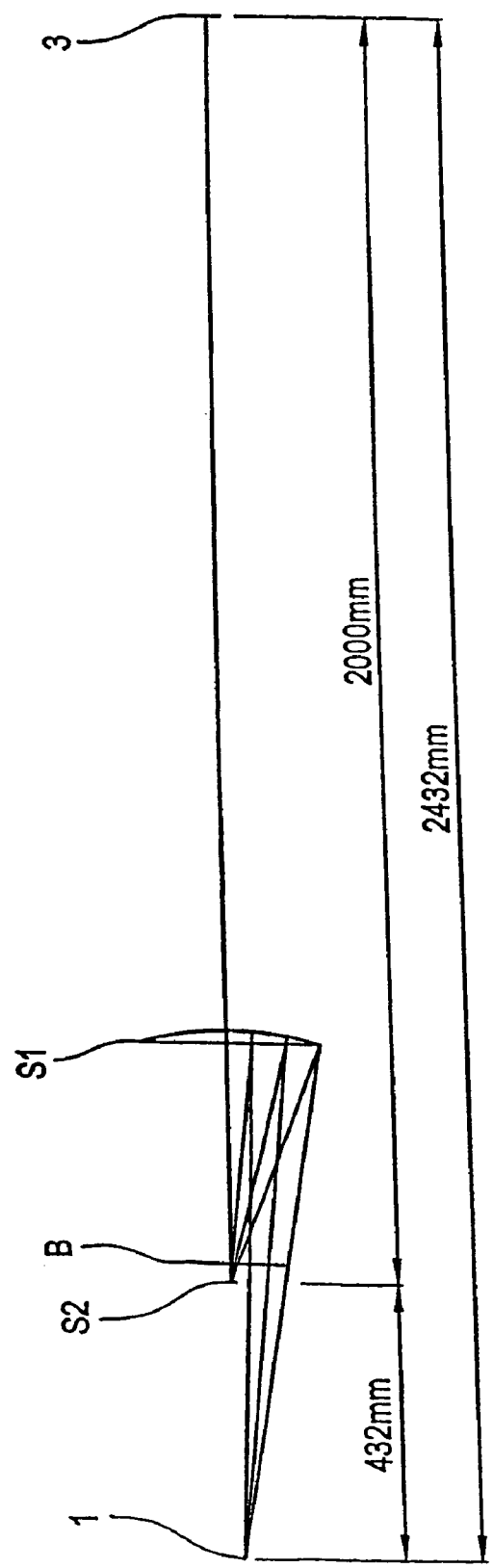

FIG. 8A

TABLE 8A

LENS NOTES:

Notes... ß'= 100
    konkav-konkav

GENERAL LENS DATA:

```
Surfaces                    :          6.
Stop                        :          3
System Aperture             : Object Space NA = 0.1672
Glass Catalogs              : schott
Ray Aiming                  : Real Reference, Cache On
  X Pupil shift             :          0
  Y Pupil shift             :          0
  Z Pupil shift             :          0
Apodization                 :Uniform, factor =   0.00000E+000
Effective Focal Length      :        -20.15204 (in air)
Effective Focal Length      :        -20.15204 (in image space)
Back Focal Length           :       1109.829
Total Track                 :       2291.4
Image Space F/#             :          0.1274999
Paraxial Working F/#        :        294.833
Working F/#                 :        296.6462
Image Space NA              :          0.001695873
Object Space NA             :          0.1672
Stop Radius                 :         79.02767
Paraxial Image Height       :          3.807881
Paraxial Magnification      :         99.99986
Entrance Pupil Diameter     :        158.0553
Entrance Pupil Position     :        325.5
Exit Pupil Diameter         :          6.838018
Exit Pupil Position         :      -1990.643
Field Type                  : Object height in Millimeters
Maximum Field               :          0.03807887
Primary Wave                :          0.0135
Lens Units                  : Millimeters
Angular Magnification       :        -23.11421

Fields          : 8
Field Type: Object height in Millimeters
  #      X-Value        Y-Value        Weight
  1      0.000000       0.005000       1.000000
  2      0.000000       0.012500       1.000000
  3      0.000000       0.020000       1.000000
  4      0.000000       0.027500       1.000000
  5      0.000000       0.035000       1.000000
  6      0.015000       0.005000       1.000000
  7      0.015000       0.020000       1.000000
  8      0.015000       0.035000       1.000000

Vignetting Factors
  #    VDX       VDY       VCX       VCY       VAN
  1  0.000000  0.000000  0.000000  0.000000  0.000000
  2  0.000000  0.000000  0.000000  0.000000  0.000000
  3  0.000000  0.000000  0.000000  0.000000  0.000000
  4  0.000000  0.000000  0.000000  0.000000  0.000000
  5  0.000000  0.000000  0.000000  0.000000  0.000000
  6  0.000000  0.000000  0.000000  0.000000  0.000000
  7  0.000000  0.000000  0.000000  0.000000  0.000000
  8  0.000000  0.000000  0.000000  0.000000  0.000000

Wavelengths     : 1
Units: Microns
  #       Value          Weight
  1       0.013500       1.000000
```

FIG. 8B

TABLE 8B

LENS NOTES:

Notes... S'= 100
konkav-konkav

SURFACE DATA SUMMARY:

| | Type | Comment | Radius | Thickness | Glass | Diameter | Conic |
|---|---|---|---|---|---|---|---|
| OBJ | STANDARD | OBJEKT-EBENE | Infinity | 140.5 | | 0.07615773 | 0 |
| 1 | STANDARD | HILFSFLÄCHE | Infinity | 325.5 | | 47.70722 | 0 |
| 2 | STANDARD | HILFSFLÄCHE | Infinity | 0 | | 158.0553 | 0 |
| STO | STANDARD | BLENDE | Infinity | 370 | | 158.0553 | 0 |
| 4 | EVENASPH | 1.SPIEGEL | -500 | -404.1 | MIRROR | 277.4292 | 0 |
| 5 | EVENASPH | 2.SPIEGEL | 100 | 2000 | MIRROR | 6.815651 | 0 |
| IMA | STANDARD | BILD-EBENE | Infinity | | | 7.497326 | |

FIG. 8C

TABLE 8C

LENS NOTES:

Notes... A'= 100
    konkav-konkav

SURFACE DATA DETAIL:

```
Surface OBJ       : STANDARD
 Comment          : OBJEKT-EBENE
 Aperture         : Rectangular Aperture
  X Half Width    :        0.015
  Y Half Width    :        0.015
  X- Decenter     :            0
  Y- Decenter     :         0.02
Surface    1      : STANDARD
 Comment          : HILFSFLÄCHE
 Aperture         : Rectangular Aperture
  X Half Width    :           30
  Y Half Width    :           15
  X- Decenter     :            0
  Y- Decenter     :       -20.64
Surface    2      : STANDARD
 Comment          : HILFSFLÄCHE
 Aperture         : Circular Aperture
  Minimum Radius  :            0
  Maximum Radius  :           30
  X- Decenter     :           .0
  Y- Decenter     :       -48.98
Surface STO       : STANDARD
 Comment          : BLENDE
Surface    4      : EVENASPH
 Comment          : 1.SPIEGEL
  Coeff on r   2  :  6.7309527e-005
  Coeff on r   4  :  2.9082276e-010
  Coeff on r   6  :  1.7291515e-015
  Coeff on r   8  : -6.2302432e-020
  Coeff on r  10  :  2.641037e-024
  Coeff on r  12  : -4.1156155e-029
  Coeff on r  14  :            0
  Coeff on r  16  :            0
Surface    5      : EVENASPH
 Comment          : 2.SPIEGEL
  Coeff on r   2  :     0.021277299
  Coeff on r   4  : -5.2803667e-006
  Coeff on r   6  :  3.6441844e-006
  Coeff on r   8  : -5.0797445e-007
  Coeff on r  10  :  3.4653654e-008
  Coeff on r  12  : -9.175105e-010
  Coeff on r  14  :            0
  Coeff on r  16  :            0
Surface  IMA      : STANDARD
 Comment          : BILD-EBENE
```

COATING DEFINITIONS:

REFLECTIVE X-RAY MICROSCOPE AND INSPECTION SYSTEM FOR EXAMINING OBJECTS WITH WAVELENGTHS <100 NM

CROSS-REFERENCE TO RELATED APPLICATIONS

The present application is a continuation of International Application No. PCT/EP03/04803, filed May 8, 2003, which claims priority of (a) German Patent Application No. 102 20 816.6, filed May 10, 2002, and (b) German Patent Application No. 102 20 815.8, filed May 10, 2002.

BACKGROUND OF THE INVENTION

1. Field of the Invention

The invention relates to a reflective X-ray microscope for examining an object in an object plane, with the object being illuminated with radiation of a wavelength $\leq 100$ nm, especially <30 nm, and imaged in an enlarged way in an image plane. Such a reflective X-ray microscope comprises a first subsystem which is arranged in the beam path from the object plane to the image plane and which comprises at least one first optically imaging element, preferably a first mirror.

2. Description of the Related Art

X-ray microscopes are known from the following applications:

U.S. Pat. No. 5,222,113
U.S. Pat. No. 5,311,565
U.S. Pat. No. 5,177,774
U.S. Pat. No. 5,144,497
U.S. Pat. No. 5,291,339
U.S. Pat. No. 5,131,023 EP-A-0 459 833

A Schwarzschild optical system with downstream diffraction grating is known from U.S. Pat. No. 5,022,064, and an inspection system with reflective X-ray microscope is known from

JP-A-2001116900.

U.S. Pat. No. 5,222,113, U.S. Pat. No. 5,311,565, U.S. Pat. No. 5,177,774, and EP-A-0 459 833 show X-ray microscopes in which zone plates are provided in the projection lens system for imaging. The Fresnel zone plate is a wave-optical imaging component in which the light is diffracted in a system of concentrically arranged circular rings. The disadvantage of using Fresnel zone plates in imaging systems with several optical elements in the X-ray-wavelength region is that Fresnel zone plates are transmittive components which lead to high losses of light due to the low transmission in the X-ray wavelength range.

X-ray microscopes comprising Schwarzschild optical systems as imaging systems are known from the U.S. Pat. No. 5,144,497, U.S. Pat. No. 5,291,339 and U.S. Pat. No. 5,131,023.

In all X-ray microscopes described in the U.S. Pat. No. 5,144,497, U.S. Pat. No. 5,291,339 and U.S. Pat. No. 5,131,023, the beam path at the object to be examined is designed in a telecentric way, which renders the imaging of objects in reflection more difficult.

A further disadvantage of such systems for the use in examining objects, and especially such used in the area of X-ray lithography, is their large overall size for achieving adequate lateral magnification. This makes their use in inspection systems for examining masks in EUV projection illumination systems more difficult.

A Schwarzschild optical system is known from U.S. Pat. No. 5,022,064 in which a diffraction grating is arranged according to the Schwarzschild optical system in order to diffract X-rays of different wavelengths into different orders and to thus split up the light in a spectral way. This system is also telecentric at the object.

A reflective X-ray microscope for examining an object for microlithography in an object plane with radiation of a wavelength <100 nm, especially 30 nm, is known from JP-A-2001116900. The X-ray microscope as disclosed in this application is a Schwarzschild optical system with a concave first mirror and a convex second mirror. In contrast to the systems as described above, the beam path for examining the object is not telecentric on the object, so that an examination in reflection of EUV reflection masks for example is enabled.

The disadvantage of a system as disclosed by JP-A-2001116900 is that it has a very large overall size when a large lateral magnification is required.

SUMMARY OF THE INVENTION

It is the object of the present invention to avoid the disadvantages of the state of the art, especially those of JP-A-2001116900, and to provide a reflective X-ray microscope that allows the examination of objects for microlithography and has a small overall size. Preferably, the overall size of the X-ray microscope is to be less than 5 m, especially preferably less than 3 m, at a magnification of 10 to 10000×, preferably 300-1000×.

In a further aspect of the invention, an inspection system is to be provided which especially allows the examination of masks for photolithographic processes with a wavelength <100 nm, preferably in the wavelength region of 10 to 30 nm.

Inspection systems, especially for the examination transmission masks for photolithographic processes with wavelengths in the UV range, are known from:

EP-A-0628806
JP-A-4-321047

The content of these applications is hereby fully incorporated in the scope of disclosure of the present application. These systems only describe the examination of transmission masks. An examination of reflection masks as are used in EUV lithography is not mentioned.

The object of the present invention to provide an X-ray microscope that allows the examination of objects for microlithography and has a short overall size is achieved by dividing the X-ray microscope in a first and second subsystem, with several embodiments being possible for this first and second subsystem.

In a first embodiment of the invention, the object is achieved in a first aspect in accordance with the invention in such a way that the first system, which comprises a first and a second mirror and which is preferably arranged in the form of a Schwarzschild optical system, is provided with a second subsystem downstream in the light path, which comprises at least a third mirror. The third mirror allows folding the beam path from the object to the image and thus to considerably reduce the overall size as compared with the system as known from JP-A-2001116900.

Systems with more than two mirrors are known in the field of EUV lithography for projection lens systems.

Such systems are shown for example by U.S. Pat. No. 5,063,586, U.S. Pat. No. 5,153,898, U.S. Pat. No. 4,798,450 or EP 0962830.

Since all these systems concern reduction lenses, none of their specifications is able to provide information as to how such a system needs to be designed with which the object is projected in an enlarging fashion into an image plane.

In particular, it is not the object of these lenses to achieve the shortest possible overall size. The imaging properties are the main aspect.

The at least third mirror of the second subsystem is used, as mentioned above, for folding the beam path and for setting a virtually telecentric beam path at the image.

It is especially preferable when the second subsystem comprises a total of two mirrors which ensure a reduction of the overall size. In particular, such an arrangement allows solving the conflicts in connection with the overall size occurring in the region of the second mirror of the first subsystem and the image plane because the object plane and the image plane are separated spatially very far from each other in a four-mirror system. In addition the object plane and the image plane are situated outside and on opposite sides of the lens.

The beam path is advantageously virtually telecentric at the image.

Preferably, the first and second mirrors of the first subsystem are shaped aspherically; the third and fourth mirror can be shaped both aspherically as well as spherically. Spherical mirrors are preferable because they are easier to produce from a production viewpoint.

In order to ensure a sufficient enlargement of the object to be examined in the image plane, the overall system has a linear magnification of $\beta \leq 10\times$, preferably in the region $300\times \leq \beta \leq 1000\times$.

The reflective X-ray microscope can be arranged either in the beam path from the object plane to the image plane without or with a real intermediate image. Embodiments with an intermediate image have the advantage that the first and second subsystem can be displaced relative to each other and thus images can be taken above and below the intermediate image focal plane that supply information on mask defects in the case of mask inspections for example, as will be described below. The intermediate image is also denoted as an intermediate aerial image.

When forming a real intermediate image in the light path after the first subsystem, the object will be achieved in the embodiments of the invention as described below in such a way that a second subsystem is provided downstream in the light path after the first subsystem comprising at least one first optical element, so that the image is imaged in the intermediate image plane in an enlarged image in the image plane.

The second subsystem can comprise a photo-emission electron microscope (PEEM) in a further embodiment. The first subsystem then merely needs to have a low first magnification, e.g. a first image magnification of $0.1\times$ to $100\times$, preferably $1\times$ to $10\times$. The PEEM can be arranged as a zoom lens with variable magnification.

The necessary magnification of the overall system to $\geq 10\times$, especially 300 to $10000\times$, from the object plane to the image plane is provided by the photo-emission electron microscope. In this manner it is possible to considerably reduce the overall size of the entire system as compared with the system known from JP-A-2001116900.

Photo-emission electron microscopes (so-called PEEMs) have been described in the state of the art and are built and sold by Focus GmbH, D-65510 Hünstetten-Görsroth. Focus GmbH has disclosed a photo-emission electron microscope that is not a microscope where light ensures the production of the image, but electrons. In the case of photo-emission electron microscopes, the object to be examined is imaged by means of imaging electron optics, comprising electron lenses. The image-producing electrons are initiated in the present case by the radiation with X-rays of a photoelectrode (e.g., a photocathode) that is arranged in, or close to, the first image plane, and are imaged by the lens system on a multi-channel plate for amplification.

In the present application, the arrangement close to the first image plane is understood as being a distance of $\leq 10 \cdot \lambda / NA'^2$, preferably $\leq 5 \cdot \lambda / NA'^2$, with $\lambda$ being the wavelength of the incident light and $NA'=NA/\beta_1$, with NA being the numerical aperture of the X-ray microscope and $\beta_1$ the image magnification of the first subsystem. The electrons multiplied with the help of the multi-channel plate can be converted into visible light on a phosphorus screen positioned behind the multi-channel plate and can be observed with a CCD camera for example. Lateral resolutions of up to 20 nm can be achieved with photo-emission electron microscopes.

As an alternative for projecting the first image into an enlarged image in the image plane by means of a photo-emission electron microscope, it is also possible to provide a second subsystem that comprises a fluorescent plate in, or close to, the first image plane, and a lens system for light of longer wavelengths that is arranged downstream of the same. As a result of the X-ray light impinging on the fluorescent plate, fluorescent radiation is produced in the region of light of longer wavelength. This fluorescent radiation can then be projected into the image plane with an optical imaging system such as a lens system or a Fresnel zone plate or any other diffractive optical element.

Suitable first systems comprise all EUV optical elements that belong to an imaging lens system such as mirrors with multilayer coating, zone plates or diffractive optical elements.

Preferably, the first subsystem comprises two mirrors, a first mirror S1 and a second mirror S2. The first mirror is preferably a concave mirror and the second mirror is a convex mirror. The first and second mirrors are preferably shaped in an aspherical way.

The second subsystem is preferably used for imaging the first image in the first image plane into a second image in a second image plane, with magnification. As a result, the image magnification of the second subsystem is high and is $\beta_1 \leq 3\times$. Preferably, it is in the region of $50 \times \leq \beta_2 \leq 500\times$. The image magnification of the second subsystem is defined in the present application by the imaging of the first image in the first image plane into an enlarged image in the second image plane. The following are possible as second subsystem: Photo-emission electron microscopes (PEEM), fluorescent converters with optical microscopes arranged in the light path downstream or other converter microscopes which are able to convert X-ray light for further processing in imaging systems on another imaging carrier, e.g. photons, electrons or ions of longer wavelength.

Preferably, the reflective X-ray microscope in accordance with the invention has an optical axis. The mirrors of the microscope are centered with respect to, i.e., centric to, the optical axis.

In contrast to the X-ray microscopes known from the US patents, the object in the object plane is preferably arranged in the reflective X-ray microscope in accordance with the invention outside of the optical axis. This allows the examination of objects in reflection, e.g. reflective EUV masks, without the object and image plane being arranged in a tilted way relative to each other, i.e. both the object plane as well as the image plane stand perpendicular on the optical axis of the reflective X-ray lens. Image defects can thus be minimized because a uniform image magnification is achieved for all field points in all directions.

It is advantageous when for setting the numerical aperture the reflective X-ray microscope comprises an aperture diaphragm. In order to set different numerical apertures it is advantageous when the aperture diaphragm is accessible. An advantageous arrangement of the aperture diaphragm is therefore an arrangement in the beam path from the object to the image plane in the first subsystem behind the object plane and before the first mirror. The aperture diaphragm is arranged in a decentered, i.e, off-centered, way relative to the optical axis. The diaphragm preferably allows setting different aperture stages with different numerical apertures of the projection illumination system.

In a second aspect of the invention, an inspection system for the examination of objects is provided, especially masks for microlithography with wavelengths of $\leqq 100$ nm. The inspection system comprises an illumination system for illuminating an object field in an object plane. The illumination system uses a discharge source, laser plasma source or a synchrotron source as a light source. The desired radiation of 13.5 nm for example can be filtered out with grating spectral filters. At least a part of the mask to be examined is arranged in the object plane within the illuminated field. Furthermore, the inspection system comprises an imaging system for wavelength $\leqq 100$ nm for projecting at least a part of the mask to be examined in an image plane. An observation system is provided in the image plane for observing the object imaged in the plane in an enlarged way.

In the inspection system in accordance with the invention, the imaging system is preferably a reflective X-ray microscope in accordance with the invention.

The inspection system in accordance with the invention preferably comprises positioning devices for positioning the object in the object plane. This allows moving certain parts of the object to be examined in a predetermined manner in the object plane and thus to take images of different parts of the object in the image plane.

In one embodiment of the invention the imaging system comprises an accessible, adjustable aperture diaphragm. The adjustable aperture diaphragm allows setting the aperture in such a way that the imaging ratios on the object are equivalent to the imaging ratios in a projection illumination system. Projection illumination systems for EUV lithography have been disclosed in WO 02/27401, WO 02/27402 or U.S. Pat. No. 6,244,717, the scope of disclosure of which is hereby fully included in the present application. The possible obscurations in an EUV projection illumination system can be simulated by an obscuration diaphragm which is arranged in the illumination system of the inspection system for example.

If the projection illumination system has a projection lens with an image-side NA of 0.3 and a magnification of 4×, then the aperture to be pre-selected on the aperture diaphragm is 0.3:4, i.e. 0.075, in order to obtain an imaging in the inspection system corresponding to the imaging in the projection system.

The adjustable aperture diaphragm can be set freely in a range of $0.001 \leqq NA \leqq 0.25$.

In addition to the adjustable aperture diaphragm, it can be provided for in a preferred embodiment of the invention that the illumination system also comprises an adjustable illumination aperture diaphragm.

With the help of the illumination aperture diaphragm which is arranged in a plane which is conjugated to the plane of the aperture diaphragm of the illumination lens system it is possible to predetermine the size of the pupil fill σ. The pupil fill is defined as:

$$\sigma = \sin \alpha / \sin \beta',$$

with sin α corresponding to the numerical aperture $NA_{illumination}$ of the illumination system on the object and sin β to the numerical aperture $NA_{imaging}$ of the imaging system on the object. The setting of a enables the simulation of different kinds of illumination systems for projection illumination installations. Whereas the aperture diaphragm and illumination aperture diaphragm, as described above, allow the setting of a circular illumination with a predetermined degree of pupil fill a when using circular diaphragms, it is possible by introducing a diaphragm changer such as a diaphragm wheel in the illumination aperture diaphragm plane to also simulate an annular, quadrupolar or dipolar illumination. A field diaphragm can be provided in a plane conjugated to the object plane for limiting the field.

Preferably, the image recording system of the inspection system comprises an analytical unit with which the images of the object in the image plane can be evaluated.

In order to allow a qualitative and quantitative inspection of the masks in addition to the simulation of the properties of the projection illumination system which is also arranged as a stepper in a special embodiment, the inspection system preferably comprises focus setting devices with which the object can be displaced in a perpendicular direction relative to the object plane. This allows taking pictures at one and the same place on the object at predetermined focal positions. Preferably, the focus is moved upwardly from below in predetermined steps in a symmetrical fashion. The pictures taken at different focal positions can be evaluated with the help of an analytical unit and at least one statement on the quality of the mask can be made. If the mask has defects at the examined location, the analytical unit allows analyzing the same precisely. The mask can optionally be repaired and then be analyzed again.

Preferably, the analytical unit comprises a microcomputer device in which the recorded image data can be processed digitally.

An especially preferred embodiment of the invention comprises a second imaging system for wavelengths >100 nm which is arranged parallel to the first imaging system. The second imaging system allows roughly inspecting the entirety of the mask at first with UV or VUV light of the I-line for example. Preferably, such an auxiliary monitoring system is arranged in a parfocal and/or parcentric manner. The entire mask can have a dimension of 6"×6" (152×152 mm) and the object field is $\leqq 2 \times 2$ mm, so that a rough inspection of the entire mask is possible. The mask can then be brought with the help of the positioning device to places where defects occur. With the help of the imaging lens system for wavelengths $\leqq 100$ nm it is possible to examine these selected places. The object field with which the imaging system for wavelengths $\leqq 100$ nm can be examined lies in the region of 100×100 μm, especially preferably 30 μm×30 μm.

In an embodiment of the invention, the second subsystem is exchangeable or replaceable. By changing the second subsystem, the object field can be enlarged and the mask can be inspected at first roughly in the entirety. The entire mask can have a dimension of 6"×6" (152×152 mm) for example and the object field $\leqq 2 \times 2$ mm, so that a rough inspection of the entire mask is possible. The mask can then be brought with the help of the positioning device to places where defects occur. With the help of another second system with a smaller object field and larger magnification, these selected places can be examined in closer detail. The object field preferably lies in the range of 100 μm×100 μm, especially preferably 30×30 μm.

In the case of systems in which the second subsystem is arranged as a photo emission electron microscope and shows a variable magnification (i.e. a zoom effect) in the region of 40 to 4000× for example, differently large object fields can be examined by setting the magnification of the photo emission electron microscope.

Preferably, at least the imaging part for wavelengths ≦100 nm of the inspection system (e.g. the first subsystem) is arranged in a vacuum suitable for EUV applications.

In addition to the inspection system in accordance with the invention, a method is also provided for the inspection of objects, especially for masks for microlithography with wavelengths ≦100 nm, in which an object field is illuminated in the object plane with an illumination system, the object to be examined is moved with a positioning device to the illuminated object field and is projected into an image plane in which an image recording system is arranged by means of an imaging system for wavelengths ≦100 nm. For the purpose of characterizing the masks, the object to be examined is moved in a preferred method with a focus adjusting devices perpendicular to the object and images are recorded at predetermined focal positions above and below the focus and are evaluated.

In the case of systems with an intermediate image, the second subsystem can be displaced alternatively or additionally relative to the focus of the intermediate image in order to record images at predetermined focal positions. Alternatively, the entire imaging apparatus or only the first subsystem can be displaced in the direction of the axis that stands perpendicular to the object plane.

The inspection system in accordance with the invention can be used in a variety of fields. As already described above, such an inspection system can be used for analyzing the defects in blank masks, coated blank masks, masks in the production process for microlithography with wavelengths ≦100 nm, as well as for checking the repair of masks. Moreover, such an inspection system can be used for simulating the exposure process in a projection exposure system by setting the aperture and the degree of pupil fill and thus to configure and optimize the projection exposure system. The inspection system is also suitable for the inspection of wafers.

BRIEF DESCRIPTION OF THE DRAWINGS

The invention is now explained by reference to the enclosed drawings, wherein:

FIG. 1 shows the overall view of a first X-ray microscope in accordance with the invention with a first subsystem comprising a first and second mirror and a second subsystem comprising a third mirror;

FIG. 1A shows Table 1A, which provides general lens data for the X-ray microscope of FIG. 1;

FIG. 1B shows Table 1B, which provides a surface data summary for the X-ray microscope of FIG. 1;

FIG. 1C shows Table 1C, which provides a surface data detail for the X-ray microscope of FIG. 1;

FIG. 2 shows a second X-ray microscope comprising a first subsystem with a first and second mirror as well as a second subsystem comprising a third and fourth mirror;

FIG. 2A shows Table 2A, which provides general lens data for the X-ray microscope of FIG. 2;

FIG. 2B shows Table 2B, which provides a surface data summary for the X-ray microscope of FIG. 2;

FIG. 2C shows Table 2C, which provides a surface detail for the X-ray microscope of FIG. 2;

FIG. 3 shows a third X-ray microscope comprising a first subsystem with a first and second mirror as well as a second subsystem comprising a third and fourth mirror, where the third mirror is spherical and the diaphragm is situated between the object plane and the first mirror;

FIG. 3A shows Table 3A, which provides general lens data for the X-ray microscope of FIG. 3;

FIG. 3B shows Table 3B, which provides a surface data summary for the X-ray microscope of FIG. 3;

FIG. 3C shows Table 3C, which provides a surface data detail for the X-ray microscope of FIG. 3;

FIG. 4 shows a fourth X-ray microscope comprising a first subsystem with a first and second mirror as well as a second subsystem comprising a third and fourth mirror, where the third and fourth mirror are spherical and the object field size is 30 μm×30 μm;

FIG. 4A shows Table 4A, which provides general lens data for the X-ray microscope of FIG. 4;

FIG. 4B shows Table 4B, which provides a surface data summary for the X-ray microscope of FIG. 4;

FIG. 4C shows Table 4C, which provides al surface data detail for the X-ray microscope of FIG. 4;

FIG. 5 shows a fifth X-ray microscope comprising a first subsystem with a first and second mirror as well as a second subsystem comprising a third and fourth mirror, where the third and fourth mirror are spherical and the object field size is 200 μm×30 μm;

FIG. 5A shows Table 5A, which provides a surface data detail for the X-ray microscope of FIG. 5;

FIG. 6 shows a sixth X-ray microscope comprising a first subsystem with a first and second mirror as well as a second subsystem comprising a third and fourth mirror, where the third and fourth mirror are spherical and all mirrors are concave mirrors;

FIG. 6A shows Table 6A, which provides general lens data for the X-ray microscope of FIG. 6;

FIG. 6B shows Table 6B, which provides a surface data summary for the X-ray microscope of FIG. 6;

FIG. 6C shows Table 6C, which provides a surface data detail for the X-ray microscope of FIG. 6;

FIG. 7 shows a seventh X-ray microscope comprising a first subsystem with a first and second mirror as well as a second subsystem comprising a third and fourth mirror, where the first mirror is a concave mirror, the second mirror is a concave mirror, the third mirror is a convex mirror and the fourth mirror is a concave mirror;

FIG. 7A shows Table 7A, which provides general lens data for the X-ray microscope of FIG. 7;

FIG. 7B shows Table 7B, which provides a surface data summary for the X-ray microscope of FIG. 7;

FIG. 7C shows Table 7C, which provides a surface data detail for the X-ray microscope of FIG. 7;

FIG. 8 shows a two-mirror X-ray microscope, where the first mirror is a concave mirror and the second mirror is a concave mirror;

FIG. 8A shows Table 8A, which provides general lens data for the X-ray microscope of FIG. 8;

FIG. 8B shows Table 8B, which provides a surface data summary for the X-ray microscope of FIG. 8;

FIG. 8C shows Table 8C, which provides a surface data detail for the X-ray microscope of FIG. 8;

DESCRIPTION OF THE INVENTION

Figure 9:
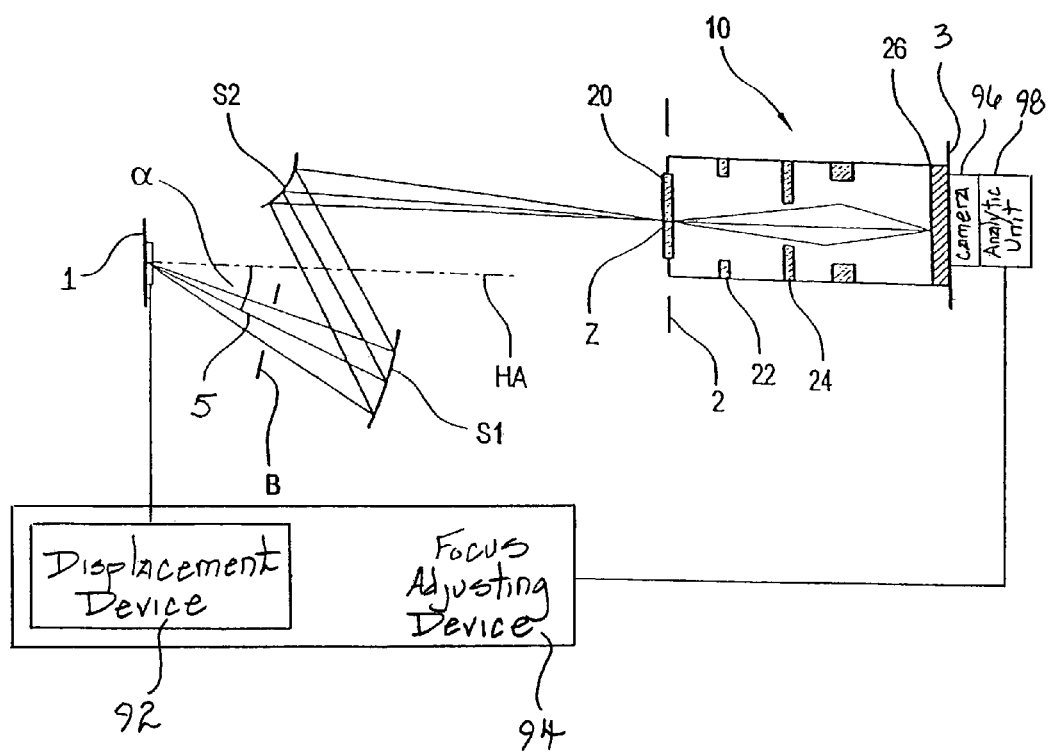
FIG. 9 shows an overall view of an X-ray microscope in accordance with the invention with a first subsystem comprising a first and second mirror and a second subsystem comprising a photo emission electron microscope.

FIG. 1 shows a first embodiment of an X-ray microscope with a first subsystem comprising a first mirror S1 and a second mirror S2. In the present embodiment, mirror S1 is a concave mirror and second mirror S2 is a convex mirror. Mirrors S1 and S2 are centered with respect to, i.e., centric to, an optical axis HA. A second subsystem comprises a third mirror S3. The third mirror is also arranged centric relative to the optical axis HA. An object is situated in an object plane 1, arranged in a decentered, i.e., off-centered, manner relative to the optical axis HA, and is projected by the X-ray microscope into an image plane 3. The image plane 3 is situated close to the second mirror S2 and an aperture diaphragm B. The aperture diaphragm B is arranged in a decentered fashion relative to the optical axis HA between object plane 1 and first mirror S1.

The radius of curvature of the first mirror S1 is $|R_1|=500$ mm, the radius of the second mirror S2 is $|R_2|=3.5$ mm and that of the third mirror S3 is $|R_3|=4000$ mm. Only the second mirror S2 has a very small radius of curvature. This small radius of curvature is necessary for producing the required large linear magnification. The aperture diaphragm B is situated between the object plane 1 and the first mirror S1, at a distance of 466 mm away from the object plane 1 and has a maximum decentered opening of 60 mm. The overall size of the optical system up to the third mirror S3, i.e. the distance from a diaphragm plane in which the aperture diaphragm B is situated, is 2007 mm and the distance from the object plane 1 up to the aperture diaphragm B is 466 mm. The overall system has a linear magnification of $\beta=-500\times$. Object and image in the object plane 1 or image plane 3 lie in a decentered manner on opposite sides relative to the optical axis HA.

The advantage of the presented three-mirror system is that it is possible to realize a low overall size of less than 2500 mm with only three mirrors, with the overall size (i.e. the distance from the aperture diaphragm B to the zenith of the third mirror S3) being 2007 mm and the distance from the object plane 1 to the aperture diaphragm B being 466 mm. The general data of the lens of the embodiment according to FIG. 1 are shown in Table 1A (FIG. 1A). The summary of the surface data are shown in Table 1B (FIG. 1B), and the details of the surface data are shown in Table 1C (FIG. 1C). All preceding and subsequent tables of the optical data are data in the ZEMAX format. The ZEMAX format is well known to the person skilled in the art.

FIG. 2 shows a four-mirror X-ray microscope system with a first subsystem comprising a first mirror S1 and a second mirror S2 as well as a second subsystem comprising a third and a fourth mirror. The first mirror is assigned the reference numeral S1, the second mirror the reference numeral S2, the third mirror the reference numeral S3 and the fourth mirror the reference numeral S4. The first mirror S1 concerns a concave mirror, the second mirror S2 a convex mirror and the third and fourth mirror S3, S4 a concave mirror each. The aperture diaphragm B is arranged in the embodiment at a small distance in front of the first mirror S1. Such an arrangement obviously leads to low vignetting. The linear magnification of the overall system is $\beta=354$, meaning that the object in the object plane 1 and the image in the image plane 3 are situated in a decentered manner on the same side relative to the optical axis HA. The general lens data of this embodiment of the invention are stated in Table 2A (FIG. 2A). The summarized surface data are stated in Table 2B (FIG. 2B) and the detail surface data in Table 2C (FIG. 2C).

FIG. 3 again shows a four-mirror X-ray microscope system with a first mirror S1, a second mirror S2, a third mirror S3 and a fourth mirror S4. The same components as in the preceding figures are provided with the same reference numerals.

The principal configuration of the system according to FIG. 3 is coaxial with rotationally symmetrical spherical or aspherical mirror segment surfaces. An object field in the object plane 1 is arranged in a decentered manner relative to the optical axis HA. All mirrors are rotationally symmetrical about the optical axis HA. The first mirror S1 is a concave mirror with a radius of curvature of $|R_1|=500$ mm, the second mirror S2 is a convex mirror with a radius of curvature of $|R_2|=50$ mm, the third mirror S3 is a concave mirror with a radius of curvature of $|R_3|=166$ mm, the fourth mirror S4 is a concave mirror with a radius of curvature of $|R_4|=4000$ mm. It is advantageous from a production viewpoint that in the embodiment according to FIG. 3 the third mirror S3 is spherical. The mirror surfaces of mirrors S1, S2 and S4 on the other hand are rotational aspheres, i.e., rotationally aspheric. The aperture diaphragm B is situated between the object plane 1 and the first mirror S1 at a distance of 840.5 mm away from the object plane 1 and comprises a maximum decentered opening of 146 mm. The overall size of the optical system, which is the distance from the diaphragm plane B to the image plane 3, is 2116 mm in the present case. The overall linear magnification of the present system is $\beta=530$, which means that the object in the object plane 1 and the image in the image plane 3 are situated in a decentered manner on the same side relative to the optical axis.

The general optical data of the system according to FIG. 3 are stated in Table 3A (FIG. 3A), the summary of the surface data in Table 3B (FIG. 3B) and the detail surface data in Table 3C (FIG. 3C).

FIGS. 4 and 5 show four-mirror systems with a first subsystem, comprising mirrors S1, S2 as well as a second subsystem, comprising mirrors S3 and S4. The same components as in the preceding FIGS. 2 and 3 are provided with the same reference numerals. The principal arrangement of the systems according to FIGS. 4 and 5 is coaxial. It is especially advantageous that the third mirror S3 and the fourth mirror S4 are provided with a spherical arrangement and only the first mirror S1 and the second mirror S2 comprise rotationally symmetrically aspheric mirror segment surfaces. The first mirror S1 is a concave mirror with a radius of curvature of $|R_1|=500$ mm, the second mirror S2 is a convex mirror with a radius of curvature of $|R_2|=100$ mm, the third mirror S3 is a concave mirror with a radius of curvature of $|R_3|=216$ mm, the fourth mirror S4 is a concave mirror with a radius of curvature of $|R_4|=4000$ mm. The overall size of the optical system, which is the distance from the diaphragm plane, in which the aperture diaphragm B is arranged, to the image plane 3, is 2183 mm. The distance between object plane 1 and the diaphragm plane is 466 mm.

The overall linear magnification of the present system is $\beta=500$, which means that the object in the object plane 1 and the image in the image plane 3 are situated in a decentered manner on the same side relative to the optical axis.

FIG. 4 shows an embodiment of an X-ray microscope in which the object field in the object plane 1 has an extension of 30 μm×30 μm and is slightly decentered, i.e. it is arranged off-axis relative to the optical axis HA. The general optical data for the embodiment according to FIG. 4 are shown in Table 4A (FIG. 4A), the summary of the surface data in Table 4B (FIG. 4B) and the detail surface data of the optical surface in Table 4C (FIG. 4C).

FIG. 5 shows a variant of the embodiment according to FIG. 4. All system data were maintained. Merely the aspherical surfaces of the mirrors S1 and S2 were changed. This change allows extending the object field to a size of 200 μm×30 μm without an wavefront error and a distortion deteriorating relative to the embodiment in FIG. 4.

Since merely the aspheres, i.e., aspheric surfaces, on the first and second mirror were changed, the general optical data according to Table 4A and the summary surface data according to FIG. 4B can also be used for the embodiment of FIG. 5. There is only a deviation in the special aspherical data of the mirrors S1 and S2. The detail optical surface data according to the embodiment FIG. 5 are given in Table 5A (FIG. 5A).

FIG. 6 shows a further variant of a four-mirror X-ray microscope system with first mirror S1, a second mirror S2, a third mirror S3 and a fourth mirror S4. The same components as in the preceding FIGS. 2 to 5 are provided with the same reference numerals. The relevant difference of the embodiment according to FIG. 6 relative to the embodiments of FIGS. 3, 4 and 5 is that the second mirror S2 is a concave mirror and is used above the optical axis HA. Light bundles traveling from the object plane to the image plane therefore extend after mirror S2 also above the optical axis HA. The linear magnification is $\beta=-500$, which means that the object in the object plane 1 and the image in the image plane 3 are situated on opposite sides of the optical axis HA.

The general optical data are shown in Table 6A (FIG. 6A), the summary surface data in Table 6B (FIG. 6B), and the detail surface data of the embodiment according to FIG. 6 in Table 6C (FIG. 6C).

FIG. 7 shows an embodiment of an X-ray microscope that corresponds to the embodiment according to FIG. 6 with the exception of the second mirror S2. The relevant difference to the embodiment according to FIG. 6 is that in FIG. 7 the third mirror S3 is a convex mirror. The linear magnification of the system according to FIG. 7 is $\beta=500$, meaning that in contrast to the embodiment according to FIG. 6 the object in the object plane 1 and the image in the image plane 3 are situated on the same side relative to the optical axis HA.

The optical data according to FIG. 7 are shown in the Table 7A (FIG. 7A), the summary surface data in Table 7B (FIG. 7B), and the detail surface data in Table 7C (FIG. 7C).

FIG. 8 shows an embodiment of an X-ray microscope system and demonstrates that when an overall size of less than 3 m is observed with two-mirror arrangements it is only possible to realize a linear magnification under reasonable conditions of a maximum of $\beta=100$ for the entire system. The system shown in FIG. 8 concerns a two-mirror system with a first mirror S1 and a second mirror S2, with the first and second mirrors S1, S2 each being concave mirrors. The general optical data of the embodiment according to FIG. 8 are shown in Table 8A (FIG. 8A), the summary surface data in Table 8B (FIG. 8B), and the detail surface data in Table 8C (FIG. 8C).

The object-side aperture of the systems according to FIGS. 1 to 8 can be set via the aperture diaphragm B and is 0.0625, for example, for simulating usual projection exposure systems. The aperture diaphragm B can be set in a range of $0.001 \leq NA \leq 0.25$. The object field size which is illuminated in the object plane 1 by an illumination system (not shown) is 30 μm×30 μm or 100×100 μm for example. If a mask (a so-called reticle) is examined for microlithography, such masks typically have dimensions of 152×152 mm. The optical systems as described before providing a reflective X-ray microscope in accordance with the invention thus only allows imaging a section of the mask. The object in the object plane 1 is projected with systems according to FIGS. 1 to 7 into the image plane 3 magnified 300 to 10000 times. Since the aperture diaphragm plane B is accessible, the aperture can be set in the diaphragm plane by means of the aperture diaphragm B in a range of $0.001 \leq NA \leq 0.25$. NA designates the image-side aperture on the object which is also designated below as aperture $NA_{imaging}$. Referring to FIG. 9, an angle α at which a principal ray 5 is incident to the object plane 1 is usually 6° relative to the optical axis HA of the system. X-ray microscopy according to the FIGS. 1 to 7 which comprises more than two mirrors allows obtaining a sufficiently magnifying X-ray microscope lens whose overall size is smaller than 3000 mm.

FIG. 9 shows a further embodiment of an X-ray microscope system with a first subsystem and a second subsystem. In this case the first subsystem comprises a first mirror S1 and a second mirror S2. The first mirror S1 is a concave mirror and the second mirror S2 is a convex mirror. The mirrors S1 and S2 are centered with respect to the optical axis HA. X-ray microscope systems with only one single mirror are also possible. The second subsystem comprises a photo emission electron microscope 10. The object in the object plane 1 which is arranged in a decentered manner relative to the optical axis HA is projected by the first subsystem into an intermediate image Z in an intermediate image plane 2. The adjustable aperture diaphragm B is arranged in a decentered way relative to the optical axis HA between the object plane 1 and the first mirror S1 in the high-aperture part of the X-ray microscope. As a result of the arrangement in the high-aperture part, different numerical apertures can be set very precisely. A photo-cathode 20 of the photo emission electron microscope 10 is arranged close to the intermediate image plane 2. The photo emission electron microscope 10 is used to project the intermediate image Z in the intermediate image plane 2 into a magnified picture in the image plane 3. Only a number of relevant components are shown of the photo emission electron microscope 10. The X-ray light impinging on a photo-cathode 20 releases electrons through the photoelectric effect. The released electrons are imaged on a fluorescent screen 26 via lenses 22 (of which only one is shown as an example) and diaphragms 24 (of which also only one is shown as an example). As a result of the fluorescent screen 26, the image produced by the electrons is converted into a visual picture which can be monitored with a monitoring device, e.g., an image recording system, such as a CCD camera 96.

The aperture of the system on the object side according to FIG. 9 can be set via the aperture diaphragm B and is 0.0725 for simulating conventional projection exposure systems for example. The aperture can be set in a range of $0.001 \leq NA \leq 0.25$. The object field size which is illuminated in the object plane 1 by an illumination system (not shown) is 30 μm×30 μm or 100×100 μm for example. If a mask (a so-called reticle) is examined for microlithography, such masks typically have dimensions of 152×152 mm. The reflective X-ray microscope in accordance with the invention thus only allows imaging a section of the mask. The object in the object plane 1 is projected into the image plane 3 magnified 300 to 10000 times. Since the aperture diaphragm plane B is accessible, as is shown especially by FIG. 9, the aperture can be set in the diaphragm plane by means of the aperture diaphragm B in a range of $0.001 \leq NA \leq 0.25$. NA designates the imaging-side aperture on the object which is also designated below as aperture $NA_{imaging}$. The angle α of the principal ray 5 in the object plane 1 is usually 6° relative to the optical axis HA of the system. With the help of the photo emission electron microscope 10 it is possible to obtain a sufficiently magnifying X-ray microscope whose overall size is less than 2000 mm.

Figure 10:
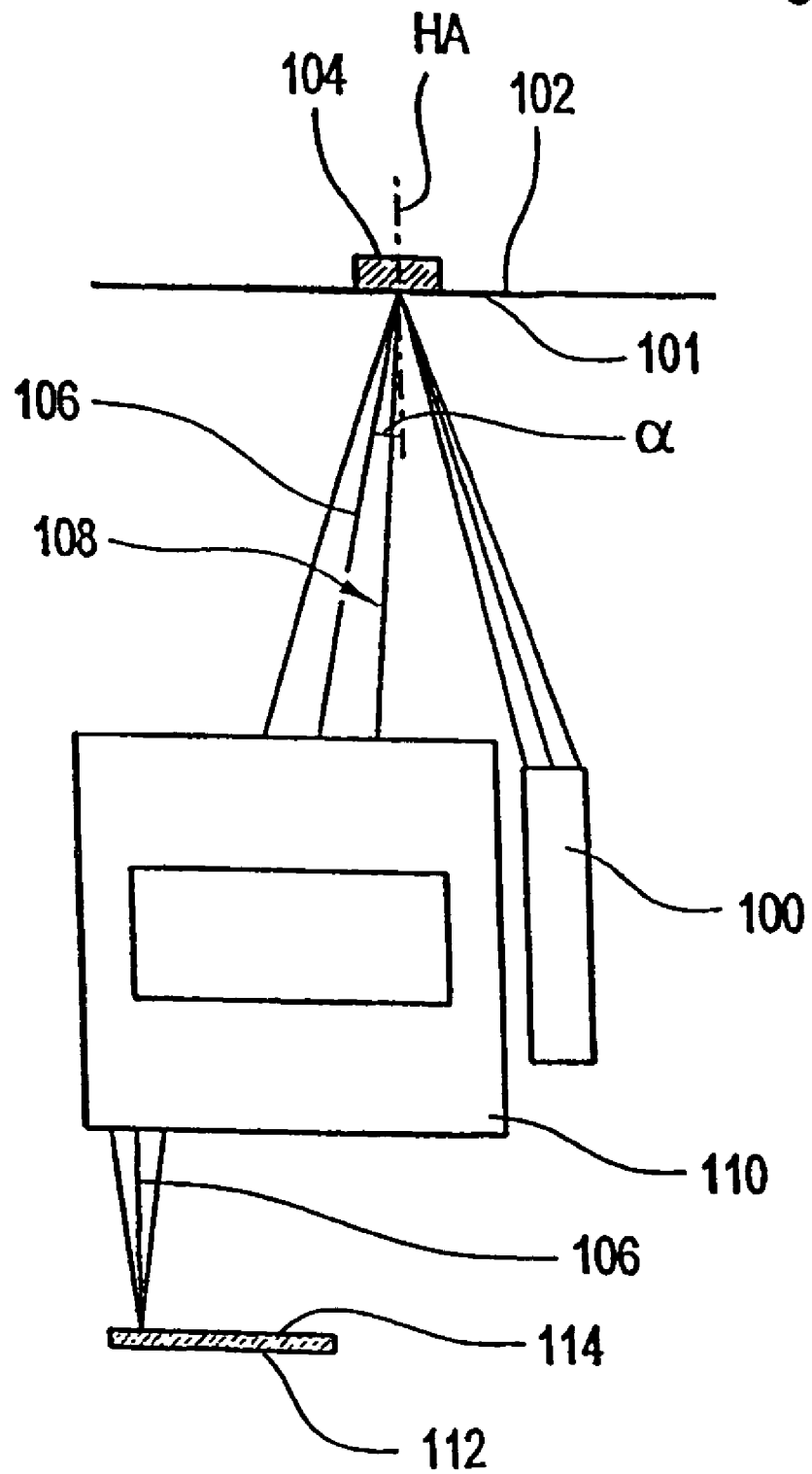
FIG. 10 shows in a schematic view an inspection system for EUV masks with an X-ray microscope in accordance with the invention.

FIG. 10 shows an inspection system in accordance with the invention, especially for examining coated EUV masks with a small object field. An illumination system 100 illuminates a field 102 in an object plane 101 in a predetermined manner. The illumination system 100 may comprise an illumination aperture diaphragm (not shown) for setting the degree of pupil fill σ. The degree of pupil fill is defined as:

$$\sigma = \sin \alpha / \sin \beta \approx NA_{illumination}/NA_{imaging},$$

With $NA_{illumination}$ being the numerical aperture in the illumination system, which is predetermined by the illumination aperture diaphragm and $NA_{imaging}$ being the numerical aperture of the X-ray microscope, which is predetermined by the aperture diaphragm B of the X-ray microscope.

In order to allow the setting of different illumination settings such as a circular, annular, quadrupolar or bipolar one, a diaphragm wheel can be arranged in an aperture diaphragm plane.

With the variably adjustable illumination aperture diaphragm, the aperture diaphragm in the X-ray microscope and the diaphragm wheel it is possible to simulate the settings in an EUV projection exposure system in which the mask or the reticle is inserted by means of the inspection system in accordance with the invention and to determine the optimal setting parameters of the projection exposure system with respect to aperture, kind of illumination, etc. by evaluating the mask images. In this way the inspection is suitable for much more than merely the examination of masks for defects. If an object 104, e.g., an EUV mask, is examined for defects, the defective places of object 104 to be examined are situated within the illuminated monitored field.

The progress of a bundle of rays is shown in FIG. 10 for the center of the field 102. A principal ray 106 of a bundle of rays 108 starting from the object plane 101 is inclined by an angle α relative to the optical axis HA. The angle α corresponds to the incident angle of the principal ray 106 in projection exposure systems on the object 104, which is about 6°.

The object 104 in the object plane 101 is projected into an image in an image plane 112 with the help of an X-ray microscope 110, which is not shown in closer detail in FIG. 10 but which may be configured according to any of FIGS. 1 to 9. As is shown in FIG. 10, the progress of a bundle of rays 108 starting out from the center of the field 102 is telecentric in the image plane 112, i.e. the principal ray 106 of a bundle of rays 108 impinges perpendicularly on the image plane 112. The intentional introduction of imaging faults by displacing one of the aperture diaphragms from the ideal position characterized by telecentricity to a non-ideal position would also be possible. This would lead to the consequence that the bundle of rays 108 would no longer impinge in a telecentric fashion on the image plane 112.

An image 114 of the object 104 in the image plane 112 is magnified. The magnification is preferably in the region of 300× up to 1000×. A monitoring apparatus (not shown in FIG. 10) is arranged in the image plane 112 for monitoring purposes. The monitoring apparatus can be a camera such as CCD camera 96, a multi-channel plate or a fluorescent screen.

Referring again to FIG. 9, the monitoring apparatus can be provided with an analytical unit 98, which is supplied with the image taken by the monitoring apparatus in digital form for example for evaluating purposes. The analytical unit 98 can be a microcomputer device such as a programmable digital computer.

The programmable digital computer can comprise control devices that drive the aperture diaphragm in the imaging optics, the illumination aperture diaphragm or the diaphragm wheel as well as the field diaphragms in the inspection system in order to set the size and shape of the illuminated object field in the object plane, the pupil fill and the numerical aperture. Moreover, the system can comprise a displacement device 92 for positioning the object to be examined in the object plane which is also designated as x-y plane. This allows examining different sections of the mask with a small object field, e.g. 30 μm×30 μm or 100 μm×100 μm, at a mask size of 152 mm×152 mm for example. By systematically covering the mask in the x-y plane, it is possible to examine the entire mask by a projection exposure system simulated by the adjustable diaphragms. Since this is very cumbersome, it is advantageously provided that the X-ray microscope is configured in such a way that the first subsystem can be separated easily from the second subsystem. If a larger or smaller object field or a higher or lower magnification is required, the second subsystem can be exchanged easily for a second subsystem with a higher or lower magnification and/or larger or smaller object field. In such a case, the entire mask can be examined roughly and the critical regions on the mask can be accessed with the help of the x-y positioning device and these regions can then be examined with another optical system for defects. In addition to the mobility in the x-y plane with the displacement device, a focus adjusting device 94 is provided in a preferred embodiment of the invention with which the object can be displaced perpendicular to the object plane and images can be recorded at predetermined focal positions above and below the focus. This allows taking pictures of the mask at different predetermined focal planes. The number of these focal planes depends on the desired precision of the examination.

In addition to the picture data at different focal planes, data on the illumination intensity in the illumination plane can be recorded for each individual picture.

Depending on the x, y and z position, it is possible to generate intensity data maps of the examined mask from the recorded image data. These intensity data maps can be compared with intensity data maps which were obtained on the basis of simulation calculations or reference data maps obtained in the examination of masks and objects which have lead to acceptable results in a projection exposure process. An examination of the mask for defects and even their repair may be possible in this manner as well as a qualification of the same.

The inspection system in accordance with the invention is not only suitable for the analysis of defects and the repair of masks for microlithography, but also for the local cleaning of the masks by radiation with light of the wavelength of the inspection system or the optimization of the design of the mask structure and for process optimization for the exposure process and the system configuration in projection exposure systems.

Figure 11:
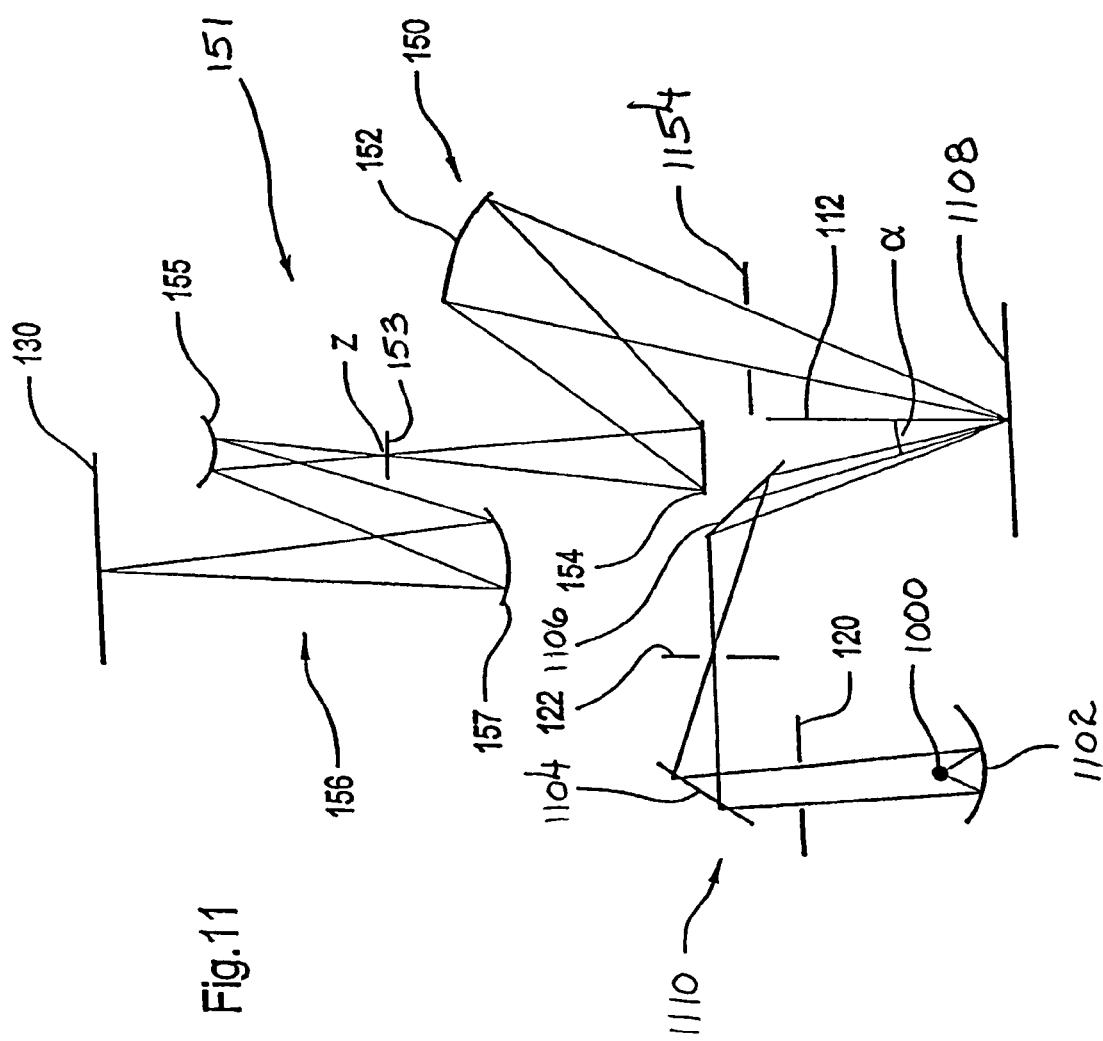
FIG. 11 shows an inspection system, with the individual components of the inspection system being shown in greater detail.

FIG. 11 shows a principal diagram of the entire inspection system. The light of an EUV light source 1000 is collected by a collector 1102 and guided via mirrors 1104, 1106 of an illumination system 1110 to an object plane 1108 in which an object, e.g., a mask, to be examined is situated. A bundle of rays of the illumination system 1110 does not impinge in a telecentric manner on the object in the object plane 1108, but under an angle. Preferably, the angle of the principal ray of the bundle of rays is identical with the principal ray angle under which the projection exposure system is operated. Preferably, this angle α relative to a normal line 112 is about 6° in a first embodiment.

In the illumination system 1110, an illumination aperture diaphragm 120 and field diaphragm 122 are arranged in a beam path from the collector 1102 to the object plane 1108. The object in the object plane 1108 which is illuminated under reflection is projected by means of an imaging system 151, e.g., an X-ray microscope in accordance with any of FIGS. 1-9, into an image plane 130 in which the object can be observed. The imaging occurs in this embodiment in two stages, namely with an intermediate image Z of light source 1000 in an image plane 153. A subsystem 150 of the imaging system 151 comprises a mirror 152 and a mirror 154. An image of the object in the object plane 1108 as projected by subsystem 150 into image plane 153, is magnified by a subsystem 156 and is projected into image plane 130. An aperture diaphragm 155 in the imaging system 151 is situated in the beam path from the object plane 1108 to image plane 153 between object plane 1108 and mirror 152. Subsystem 156 can comprise an optical system for example which comprises at least one mirror, e.g. a PEEM. This has already been described above in detail.

Figure 12:
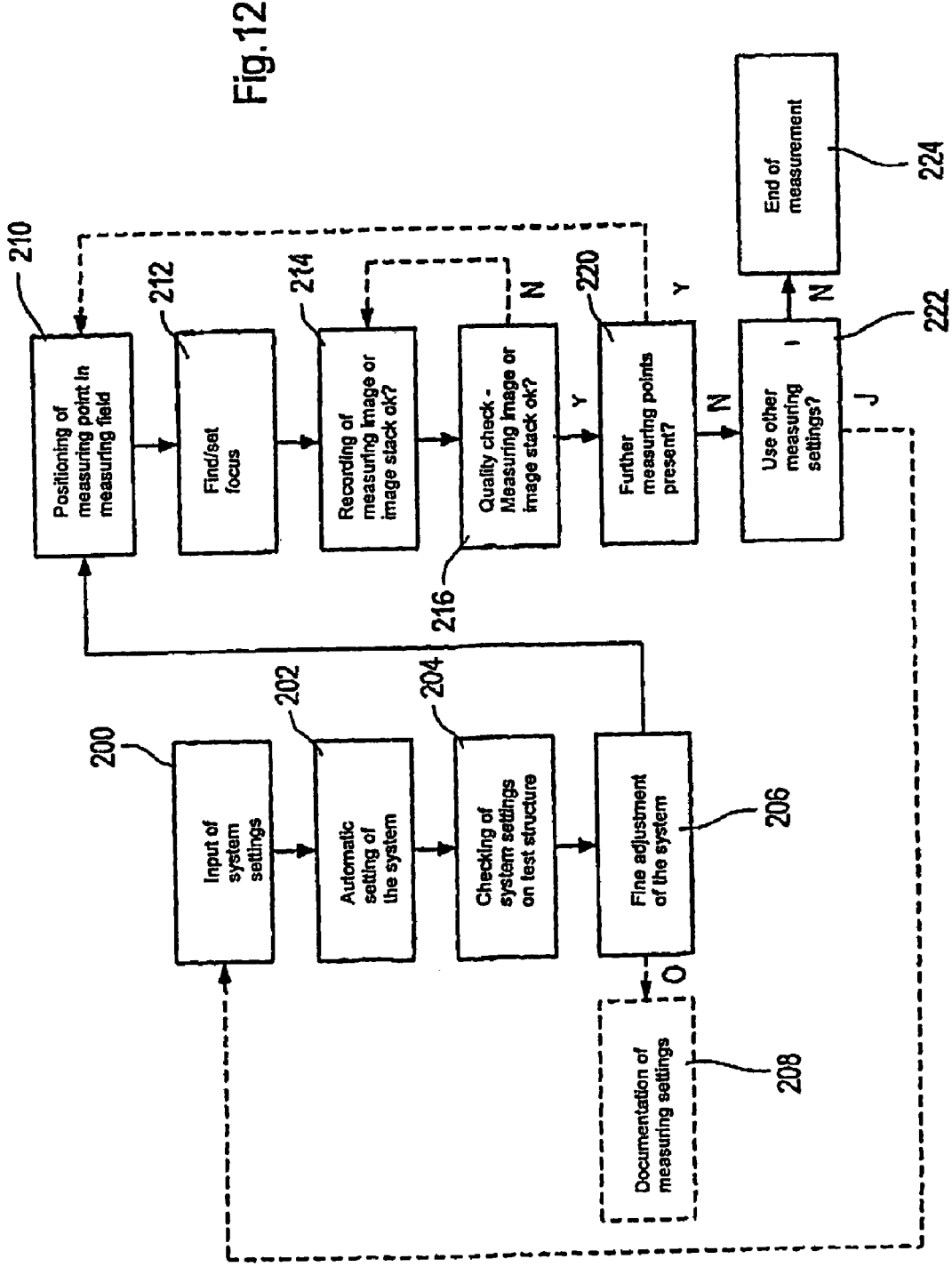
FIG. 12 shows a flow chart for the performance of a measurement.

FIG. 12 shows an exemplary measurement sequence for examining an object with the help of the inspection system in accordance with the invention. In a first step 200 there is an input of the system settings, e.g. the aperture $NA_{imaging}$, the aperture $NA_{illumination}$ as well as the obscuration and field diaphragm. The system, especially the diaphragms are then set in a second step 202 automatically. The system settings are then checked in a step 204 on the basis of a test structure, e.g. a linear structure in the x- and y-direction. The test structure is then used to fine-tune the system in a step 206. In a step 210 the measuring point in the measuring field (which is region of the object to be examined) is then positioned e.g. by movement of the x-y table to the respective position. Optionally, a documentation of the measurement settings can be made in a step 208 before the positioning in the measuring field.

After the measuring point to be examined has been positioned, the focus is set in a step 212. Has the focus been found in step 212, then either the measuring image is taken in step 214 or the focus is scanned as described before, i.e. measuring images for different z-positions are taken. Quality control is performed after each measuring image in step 216 or the measuring images associated with different focal positions are evaluated in a qualitative respect. If they meet the quality requirements, the object is moved to a further measuring point (if there is one) and the measuring sequence is taken again there as described above. If quality control leads to a negative result, a new measuring picture is taken at the same place or a number of measuring pictures which are assigned to different z-positions.

If there are no further measuring positions 220, the system settings can either be changed in step 222 or the measurement can be ended in step 224.

Figure 13:
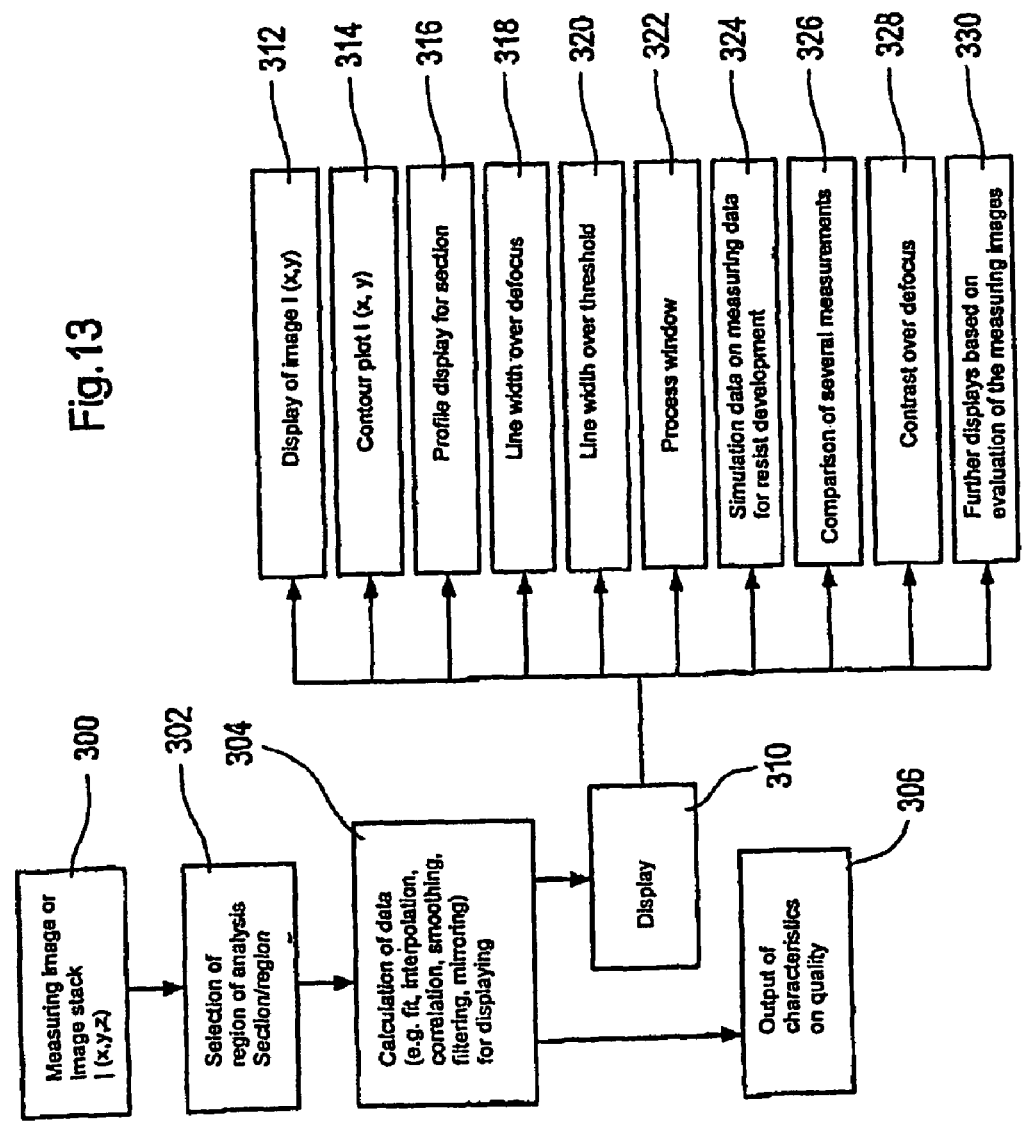
FIG. 13 shows possible treatments of the recorded images.

FIG. 13 shows possible evaluations of measuring pictures or measuring information which are gained with the help of the inspection system and which can be performed with the help of a computer device for example. The chosen measuring image 300 which is a function of the place on the object to be examined in the object plane, i.e. in the x-y plane and in the z-direction when different measuring pictures are taken above and below the focal plane, can be chosen in a step 302 both with respect to place on the sample (i.e. the x-y position, meaning the region) as well as with respect to the z-position (i.e. the section) and then be analyzed. The selected data can be edited numerically and certain representations can be calculated, as shown in step 304. For example, the data can be fitted, interpolated, correlated, smoothed, filtered or mirrored. The preparation of the data by calculation or preparation in step 304 can also be characterized in an automated way on the basis of characteristic figures with respect to quality in step 306.

As an alternative to outputting characteristic figures on quality or in addition thereto, different representations can be performed in step 310. It is possible to provide an image representation of the intensity in the x-, y-direction or also a contour plot. This is indicated with the reference numerals 312 and 314. Alternatively, profiles for the sections can be shown or the line width over the defocusing, i.e. the movement in the z-direction. This is indicated with reference numerals 316 and 318. Moreover, the line width over the threshold can be shown. This is marked with reference numeral 320. Alternative types of illustrations are the process window which is marked with reference numeral 322 and a display of simulation data with respect to measurement data for resist development, which is marked with reference numeral 324. A comparison of different measurements is possible or an illustration of the contrast over the defocusing, i.e. the movement in the z-direction. This is marked with reference numerals 326 and 328. Other illustrations based on the evaluation of the measurement pictures are possible according to step 330. The possible types of illustration are described in detail for inspection systems which operate in the wavelength region $\leq 193$ nm in the Operating Manual AIMS Fab B 41003E and/or Software Manual AIMS Fab B40409E of Carl Zeiss Microelectronic Systems GmbH. The scope of disclosure of these documents is hereby fully included in the present application.

Figure 14A:
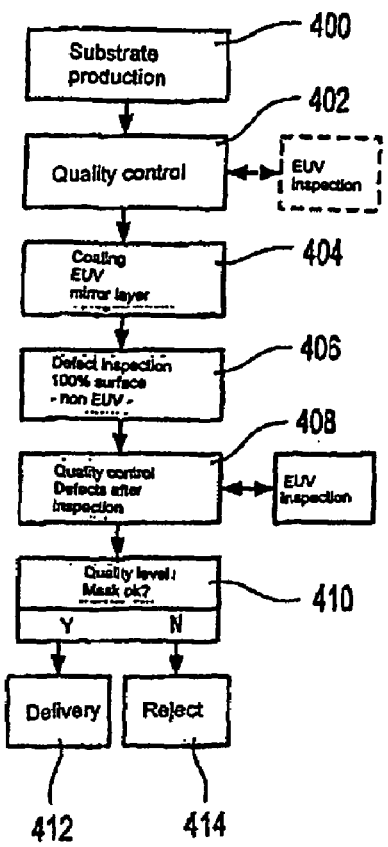
FIGS. 14A to 14C show possible fields of use for the inspection system in accordance with the invention.
Figure 14B:
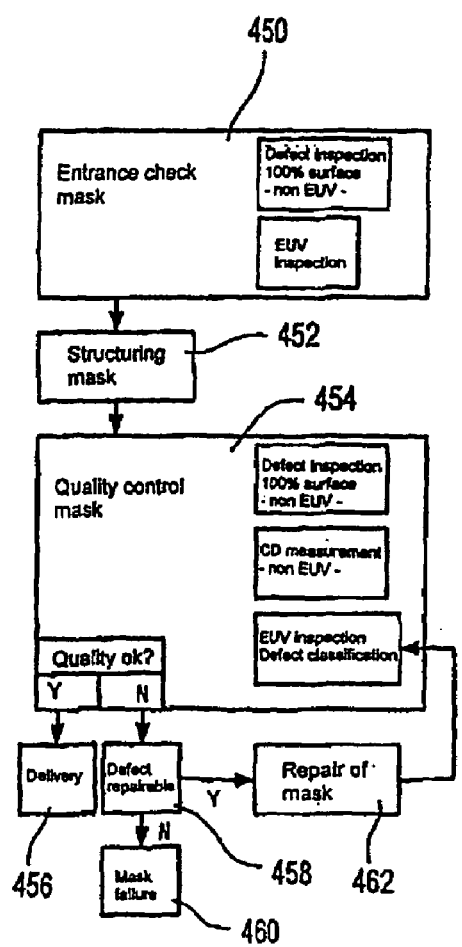
Figure 14C:
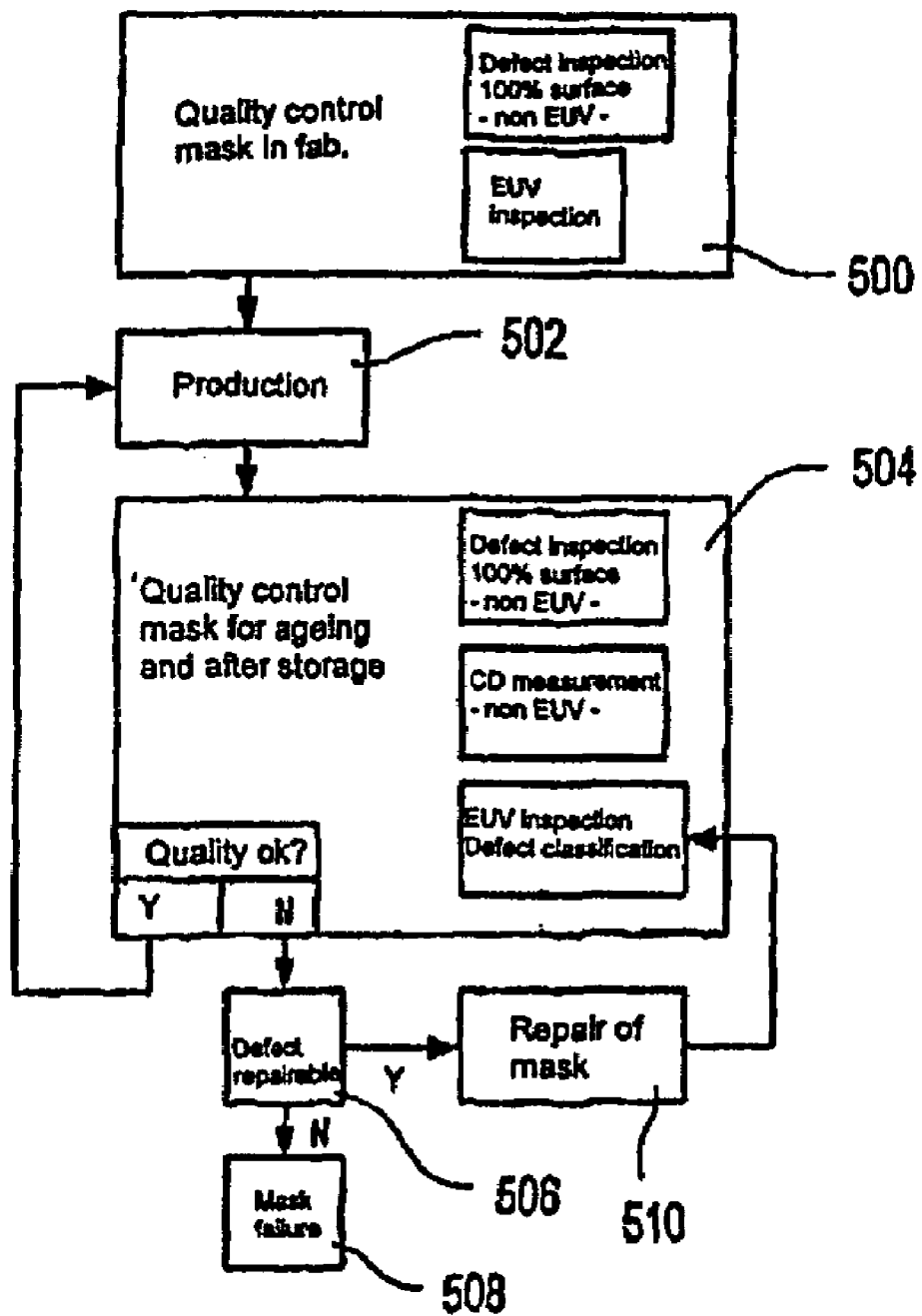

FIGS. 14A to 14C show possible fields of application of the inspection system in accordance with the invention. FIG. 14A shows the use of EUV inspection system in the production of mask blanks for example, i.e. blanks used for masks. The substrate produced in step 400 which is usually a glass substrate can be checked in step 402 with the help of the EUV inspection system in accordance with the invention with respect to its quality. If this quality is sufficient, then the substrate is coated in step 404 with EUV mirror layers. These mirror layers are inspected in step 406 for defects, namely the entire surface. The defect inspection according to step 406 occurs with an inspection module, e.g. an imaging system parallel to the EUV imaging system which works with visible light. If there are defects on the mask, these defects can be examined in more detail with the help of the EUV examination system according to step 408. For this purpose the mask examined previously over the entire surface is moved with an x-y positioning device to the defective places and these areas of the mask are examined in more detail with the EUV inspection system. If the quality of the mask is sufficient according to step 410 after the performed EUV inspection, the mask can be delivered according to step 412 or is rejected according to step 414.

FIG. 14B shows the use in mask production as a further field of application of the EUV inspection system in accordance with the invention. The incoming coated mask substrate can be examined according to FIG. 14B in step 450 with the help of the EUV inspection system in on-receipt inspection. If the mask is of adequate quality it can be structured in a subsequent step 452. The entire structured mask according to step 452 can be examined in step 454 again in a qualitative respect with the help of the EUV inspection system. As in the case of an on-receipt inspection 450, there is a defect inspection first of the entire mask surface with an inspection system which works with visible light for example and a CD measurement which is also performed with a system which works in the visible or UV or VUV wavelength ranges. If the defect inspection or CD measurement which is not performed with EUV radiation reveals defects, the EUV inspection system in accordance with the invention can be used to further classify the defects found there. If as a result of the EUV inspection of the defects the quality of the masks is regarded as sufficient after the defect inspection, then they can be delivered according to step 456. If the mask is inadequate from a qualitative viewpoint, then the mask can be moved to the respective defect point and examined in step 458 whether a repair is possible or not. If no repair is possible, then the mask will be rejected according to step 460. If a repair is possible, then it is performed according to step 462 and subjected to EUV inspection again. If sufficient quality data are now obtained, then the repaired mask can be delivered.

FIG. 14C shows the use of such an inspection system in the wafer factory as a field of application of the EUV inspection system in accordance with the invention.

In the wafer factory, the mask can be subjected at first to an on-receipt inspection according to step 500. The mask will age in the course of the production process 502. The masks can be examined in regular intervals with the help of the EUV inspection system with respect to their quality concerning ageing and storage according to step 504. For this purpose it is examined again with radiation in the visible or UV or VUV wavelength range over the entire surface for defects. An EUV inspection is made at places where defects have occurred. If the mask quality is still adequate, the mask can be used further in production. If the EUV inspection reveals that the mask no longer meets the qualitative requirements, it can be examined whether the defect is repairable. This step is designated with step 506. If a repair is not possible, the mask is taken from the production process according to step 508. If a repair is possible, the mask will be repaired according to step 510 and after the repair it is inspected again with the help of the EUV inspection system. The defect will be classified after the performed repair and brought back to the production process again in case of sufficient quality of the mask and rejected in case of insufficient quality.

The invention thus provides for the first time an X-ray microscope and an inspection system for objects used in EUV lithography which are characterized by a short overall length and a compact design.

The invention claimed is:

1. An inspection system comprising:
   an illumination system for illuminating an object in a field in an object plane;
   an imaging system for wavelengths less than or equal to 100 nm, for reflecting, magnifying and projecting light from at least one section of said object, to produce an image of said object in an image plane; and
   an image recording system in said image plane, for recording said image,
   wherein said imaging system comprises a reflective X-ray microscope that comprises:
      a first subsystem arranged in a beam path from said object plane to said image plane, wherein said first subsystem includes a first optical element for wavelengths <30 nm, and forms an intermediate image of said object in an intermediate image plane in said beam path; and
      a second subsystem arranged after said first subsystem in said beam path after said intermediate image.

2. The inspection system of claim 1, further comprising a device for positioning said object in said object plane.

3. The inspection system of claim 1, wherein said imaging system comprises an adjustable aperture diaphragm.

4. The inspection system of claim 1,
   wherein said imaging system comprises an aperture diaphragm in a diaphragm plane, and
   wherein said illumination system comprises an adjustable illumination aperture diaphragm in a plane that is conjugated to said diaphragm plane.

5. The inspection system of claim 1,
   wherein said imaging system comprises an aperture diaphragm in a diaphragm plane, and
   wherein said illumination system comprises an obscuration diaphragm in or close to either of said diaphragm plane or a plane that is conjugated to said diaphragm plane.

6. The inspection system of claim 1, wherein said illumination system comprises an adjustable field diaphragm.

7. The inspection system of claim 1, wherein said image recording system comprises an analytical unit for analyzing a picture of the object.

8. The inspection system of claim 7, wherein said analytic unit comprises a microcomputer device.

9. The inspection system of claim 1, further comprising a focus adjusting device.

10. The inspection system of claim 9, wherein said focus adjusting device comprises a displacement device for displacing said object in a perpendicular direction relative to the object plane.

11. The inspection system of claim 9,
    wherein said focus adjusting device situates said object at a focal position, and
    wherein image recording system takes a picture of said object at said focal position.

12. The inspection system of claim 1,
    wherein said first subsystem has a first mirror and a second mirror; and
    wherein said second subsystem has a third mirror.

13. The inspection system of claim 1, further comprising a focus adjusting device that displaces said second subsystem in a direction towards said intermediate image plane and displaces said object in a perpendicular direction relative to said object plane.

14. The inspection system of claim 1, wherein said inspection system is at least partially arranged in an environment selected from the group consisting of a vacuum and a protective gas.

15. The inspection system of claim 1, further comprising an auxiliary monitoring system for wavelengths ≧100 nm for projecting at least a part of said object into a further image plane, wherein said auxiliary monitoring system is parallel to said imaging system for wavelengths ≦100 nm.

16. The inspection system of claim 15, wherein said auxiliary monitoring system is arranged in a manner selected from the group consisting of a parfocal manner and a parcentered manner.

17. The inspection system of claim 1, further comprising a focus adjusting device that displaces the second subsystem in a direction towards said intermediate image plane.

18. The inspection system of claim 1, wherein said object is a mask for micro lithography.

19. A method for the inspection of an object, comprising:
    illuminating a field in an object plane with an illumination system;
    displacing said object in said field with a positioning device;

projecting an image of said object into an image plane with a reflective X-ray microscope for wavelengths ≦100 nm; and recording said image with an image recording system, wherein said reflective X-ray microscope comprises:

a first subsystem arranged in a beam path from said object plane to said image plane, wherein said first subsystem includes a first optical element for wavelengths <30 nm, and forms an intermediate image of said object in an intermediate image plane in said beam path; and a second subsystem arranged after said first subsystem in said beam path after said intermediate image.

20. The method of claim 19, further comprising:

displacing said second subsystem in a direction perpendicular to a plane in which said intermediate image is situated, to set a focus, wherein said recording comprises recording said images at predetermined focal positions or above and below said focus.

21. The method of claim 19, further comprising setting a numerical aperture of said reflective X-ray microscope.

22. An inspection system comprising:

an illumination system for illuminating an object in a field in an object plane;

an imaging system for wavelengths less than or equal to 100 nm, for magnifying and projecting at least one section of said object into an image plane; and an image recording system in said image plane, wherein said imaging system comprises a reflective X-ray microscope that includes:

a first subsystem, having a first mirror and a second mirror, disposed in a beam path from said object plane to said image plane; and a second subsystem, situated downstream of said first subsystem in said beam path, having a third mirror.

23. The inspection system of claim 22, wherein said first subsystem includes a first optical element for wavelengths <30 nm, and forms an intermediate image of said object in an intermediate image plane in said beam path, and wherein said second subsystem is situated after said intermediate image.

24. The inspection system of claim 23, further comprising:

a focus adjusting device that displaces said second subsystem in a direction towards said intermediate image plane and displaces said object in a perpendicular direction relative to said object plane.

25. The inspection system of claim 23, further comprising a focus adjusting device that displaces the second subsystem in a direction towards said intermediate image plane.

* * * * *